(12) United States Patent
Hwang et al.

(10) Patent No.: US 11,631,413 B2
(45) Date of Patent: *Apr. 18, 2023

(54) ELECTRONIC APPARATUS AND CONTROLLING METHOD THEREOF

(71) Applicant: SAMSUNG ELECTRONICS CO., LTD., Suwon-si (KR)

(72) Inventors: Inchul Hwang, Suwon-si (KR); Hyeonmok Ko, Suwon-si (KR); Munjo Kim, Suwon-si (KR); Hojung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/852,495

(22) Filed: Jun. 29, 2022

(65) Prior Publication Data

US 2022/0328044 A1     Oct. 13, 2022

Related U.S. Application Data

(63) Continuation of application No. 16/671,518, filed on Nov. 1, 2019, now Pat. No. 11,393,468.

(30) Foreign Application Priority Data

Nov. 2, 2018   (KR) .......................... 10-2018-0133827

(51) Int. Cl.
*G10L 15/22*      (2006.01)
*G10L 15/16*      (2006.01)

(52) U.S. Cl.
CPC .............. *G10L 15/22* (2013.01); *G10L 15/16* (2013.01); *G10L 2015/227* (2013.01)

(58) Field of Classification Search
CPC ... G10L 15/22; G10L 15/16; G10L 2015/227; G06F 3/017; G06F 3/167; G06F 3/01; G06N 3/08

See application file for complete search history.

(56) References Cited

U.S. PATENT DOCUMENTS 9,208,556 B2   12/2015   Giger et al.
9,302,393 B1    4/2016   Rosen et al.
(Continued)

FOREIGN PATENT DOCUMENTS

CN      104216677 A     12/2014
EP       0 926 588       6/1999
(Continued)

OTHER PUBLICATIONS

U.S. Appl. No. 16/671,518, filed Nov. 1, 2019; Hwang et al.
(Continued)

*Primary Examiner* — Daniel C Washburn
*Assistant Examiner* — Athar N Pasha
(74) *Attorney, Agent, or Firm* — Nixon & Vanderhye P.C.

(57) ABSTRACT

An electronic apparatus is provided. The electronic apparatus includes a memory and a processor configured to control the electronic apparatus to: classify a plurality of input data into a plurality of types to store in the memory, determine at least one among the input data of the classified plurality of types based on a voice command being recognized among the input data, and provide response information corresponding to the voice command based on the input data of the determined type.

20 Claims, 16 Drawing Sheets

(56) References Cited

U.S. PATENT DOCUMENTS

| | | |
|---|---|---|
| 9,305,569 B2 | 4/2016 | Jang et al. |
| 9,378,455 B2 | 6/2016 | Yufik |
| 9,899,022 B2 | 2/2018 | Kawashima et al. |
| 2006/0290709 A1 | 12/2006 | Omi et al. |
| 2011/0313768 A1 | 12/2011 | Klein |
| 2015/0030260 A1 | 1/2015 | Arikuma et al. |
| 2016/0091967 A1 | 3/2016 | Prokofieva et al. |
| 2016/0162683 A1 | 6/2016 | Gibson et al. |
| 2017/0228036 A1 | 8/2017 | Klein et al. |
| 2018/0278740 A1 | 9/2018 | Choi et al. |
| 2019/0378092 A1 | 12/2019 | Alexander |
| 2020/0051554 A1 | 2/2020 | Kim et al. |
| 2020/0404386 A1 | 12/2020 | McCartney, Jr. |

FOREIGN PATENT DOCUMENTS

| | | |
|---|---|---|
| EP | 2 555 536 | 2/2013 |
| KR | 10-2018-0046649 | 5/2018 |
| KR | 10-2018-0084392 | 7/2018 |
| KR | 10-1900092 | 9/2018 |

OTHER PUBLICATIONS

Search Report and Written Opinion dated Feb. 18, 2020 in counterpart International Application No. PCT/KR2019/014742.
Extended Search Report dated Mar. 9, 2020 in counterpart European Patent Application No. 19206725.4.
Translation of KR20180084392A (Year: 2018).
Translation of CN-1 04216677-A (Year: 2014).
European Examination Report dated Feb. 8, 2022 for EP Application No. 202117014761.
India Examination Report dated Feb. 23, 2022 for IN Application No. 19206725.4.

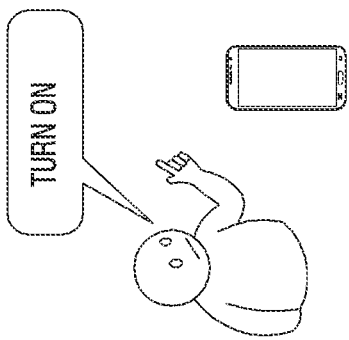

FIG. 4A

| TYPE | INFORMATION |
|---|---|
| FACE ID | face-user1 |
| GESTURE | none |
| GENDER | female |
| AGE | 30 |
| EMOTION (IMAGE) | joy 0.6 |
| VOICE ID | voice-user1 |
| TEXT | BIXBY |
| EMOTION (TEXT) | neutral 0.6 |
| EMOTION (VOICE) | joy 0.8 |

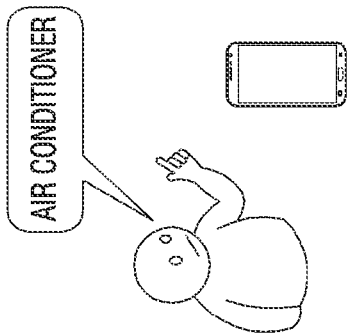

FIG. 4B

| TYPE | INFORMATION |
|---|---|
| FACE ID | face-user1 |
| GESTURE | left |
| GENDER | female |
| AGE | 30 |
| EMOTION (IMAGE) | joy 0.6 |
| VOICE ID | voice-user1 |
| TEXT | OVER THERE |
| EMOTION (TEXT) | neutral 0.6 |
| EMOTION (VOICE) | none |

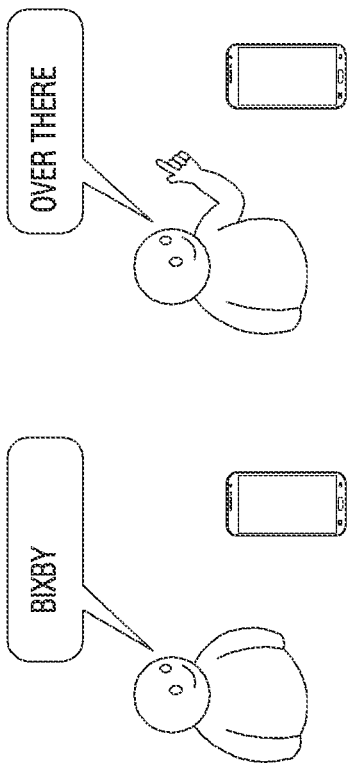

FIG. 4C

| TYPE | INFORMATION |
|---|---|
| FACE ID | face-user1 |
| GESTURE | left |
| GENDER | female |
| AGE | 30 |
| EMOTION (IMAGE) | neutral 0.6 |
| VOICE ID | voice-user1 |
| TEXT | AIR CONDITIONER |
| EMOTION (TEXT) | neutral 0.6 |
| EMOTION (VOICE) | joy 0.6 |

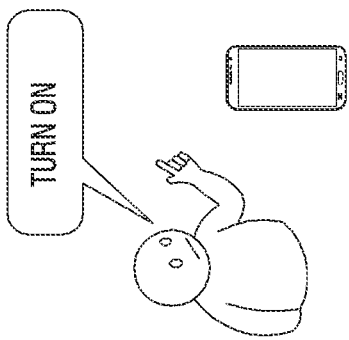

FIG. 4D

| TYPE | INFORMATION |
|---|---|
| FACE ID | face-user1 |
| GESTURE | left |
| GENDER | female |
| AGE | 30 |
| EMOTION (IMAGE) | neutral 0.6 |
| VOICE ID | voice-user1 |
| TEXT | TURN ON |
| EMOTION (TEXT) | neutral 0.6 |
| EMOTION (VOICE) | joy 0.6 |

| TYPE | INFORMATION |
|---|---|
| FACE ID | face-user1 |
| GESTURE | none |
| GENDER | female |
| AGE | 30 |
| EMOTION (IMAGE) | joy 0.6 |
| VOICE ID | voice-user1 |
| TEXT | BIXBY |
| EMOTION (TEXT) | neutral 0.6 |
| EMOTION (VOICE) | joy 0.8 |

R2

| TYPE | INFORMATION |
|---|---|
| FACE ID | face-user1 |
| GESTURE | left |
| GENDER | female |
| AGE | 30 |
| EMOTION (IMAGE) | joy 0.6 |
| VOICE ID | voice-user1 |
| TEXT | OVER THERE |
| EMOTION (TEXT) | neutral 0.6 |
| EMOTION (VOICE) | none |

R3

| TYPE | INFORMATION |
|---|---|
| FACE ID | face-user1 |
| GESTURE | left |
| GENDER | female |
| AGE | 30 |
| EMOTION (IMAGE) | neutral 0.6 |
| VOICE ID | voice-user1 |
| TEXT | AIR CONDITIONER |
| EMOTION (TEXT) | neutral 0.6 |
| EMOTION (VOICE) | joy 0.6 |

R4

| TYPE | INFORMATION |
|---|---|
| FACE ID | face-user1 |
| GESTURE | left |
| GENDER | female |
| AGE | 30 |
| EMOTION (IMAGE) | neutral 0.6 |
| VOICE ID | voice-user1 |
| TEXT | TURN ON |
| EMOTION (TEXT) | neutral 0.6 |
| EMOTION (VOICE) | joy 0.6 |

FIG. 10A

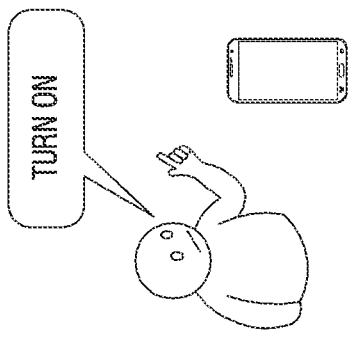

| TYPE | INFORMATION |
|---|---|
| FACE ID | face-user1 |
| GESTURE | none |
| GENDER | female |
| AGE | 30 |
| EMOTION (IMAGE) | joy 0.6 |
| VOICE ID | voice-user1 |
| TEXT | BIXBY |
| EMOTION (TEXT) | neutral 0.6 |
| EMOTION (VOICE) | joy 0.8 |

FIG. 10B

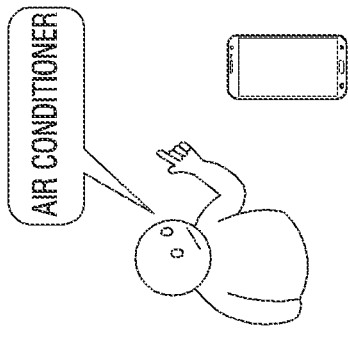

| TYPE | INFORMATION |
|---|---|
| FACE ID | face-user1 |
| GESTURE | left |
| GENDER | female |
| AGE | 30 |
| EMOTION (IMAGE) | joy 0.6 |
| VOICE ID | voice-user1 |
| TEXT | OVER THERE |
| EMOTION (TEXT) | neutral 0.6 |
| EMOTION (VOICE) | none |

FIG. 10C

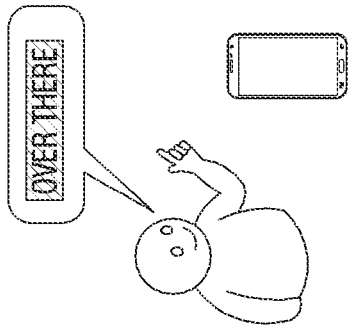

| TYPE | INFORMATION |
|---|---|
| FACE ID | face-user1 |
| GESTURE | left |
| GENDER | female |
| AGE | 30 |
| EMOTION (IMAGE) | neutral 0.6 |
| VOICE ID | voice-user1 |
| TEXT | AIR CONDITIONER |
| EMOTION (TEXT) | neutral 0.6 |
| EMOTION (VOICE) | joy 0.6 |

FIG. 10D

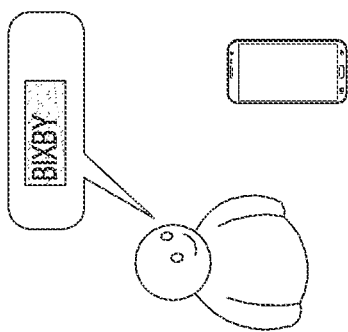

| TYPE | INFORMATION |
|---|---|
| FACE ID | face-user1 |
| GESTURE | left |
| GENDER | female |
| AGE | 30 |
| EMOTION (IMAGE) | neutral 0.6 |
| VOICE ID | voice-user1 |
| TEXT | TURN ON |
| EMOTION (TEXT) | neutral 0.6 |
| EMOTION (VOICE) | joy 0.6 |

FIG. 11

| EXAMPLE 1 | | Wake up word | Slot1 | Intent |
|---|---|---|---|---|
| | VOICE | Bixby | AIR CONDITIONER OVER THERE | TURN ON |
| | TYPE | TEXT | TEXT, GESTURE | VOICE ID |

| EXAMPLE 2 | | Wake up word | Slot1 | Intent |
|---|---|---|---|---|
| | VOICE | Bixby | THIS BOOK | BUY |
| | TYPE | TEXT | TEXT, GESTURE | VOICE ID, FACE ID |

| EXAMPLE 3 | | Wake up word | Slot1 | Slot2 | Intent |
|---|---|---|---|---|---|
| | VOICE OR EMOTION | Bixby | BALLAD MUSIC | DEPRESSED | PLAY |
| | TYPE | TEXT | TEXT | EMOTION (IMAGE), EMOTION (TEXT), EMOTION (VOICE) | VOICE ID |

| EXAMPLE 4 | | Wake up word | Slot1 | Slot2 | Slot3 | Intent |
|---|---|---|---|---|---|---|
| | VOICE OR EMOTION | Bixby | DECEMBER 1 | TRAVEL | PLEASURE | REGISTER PLAN |
| | TYPE | TEXT | TEXT | TEXT | EMOTION (IMAGE), EMOTION (TEXT), EMOTION (VOICE) | VOICE ID, FACE ID |

FIG. 12
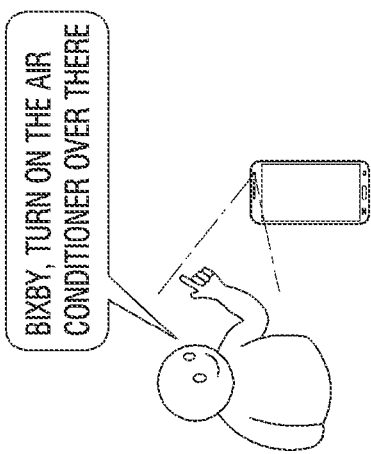
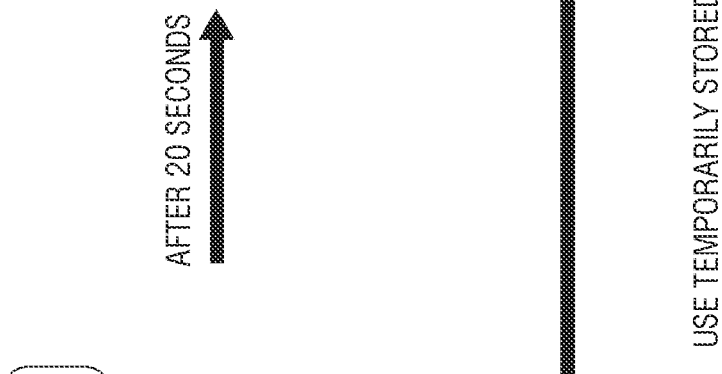
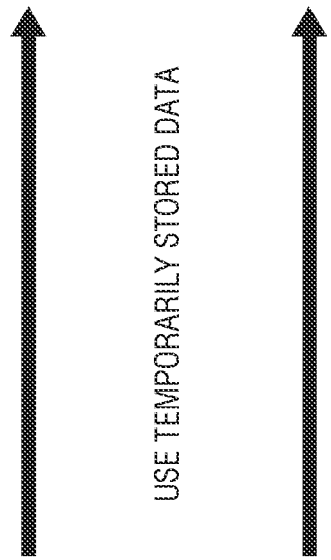

FIG. 13

| EXAMPLE 3 | Wake up word | Slot1 | Intent | Slot2 |
|---|---|---|---|---|
| VOICE OR EMOTION | Bixby | BALLAD MUSIC | PLAY | DEPRESSED |
| TYPE | TEXT | TEXT | VOICE ID | EMOTION (IMAGE), EMOTION (TEXT), EMOTION (VOICE) |

| TYPE | INFORMATION |
|---|---|
| FACE ID | face-user1 |
| GESTURE | none |
| GENDER | female |
| AGE | 30 |
| EMOTION (IMAGE) | sad 0.2 |
| VOICE ID | voice-user1 |
| TEXT | BIXBY, |
| EMOTION (TEXT) | neutral 0.6 |
| EMOTION (VOICE) | neutral 0.6 |

| TYPE | INFORMATION |
|---|---|
| FACE ID | face-user1 |
| GESTURE | none |
| GENDER | female |
| AGE | 30 |
| EMOTION (IMAGE) | sad 0.4 |
| VOICE ID | voice-user1 |
| TEXT | BALLAD MUSIC |
| EMOTION (TEXT) | neutral 0.6 |
| EMOTION (VOICE) | sad 0.8 |

| TYPE | INFORMATION |
|---|---|
| FACE ID | face-user1 |
| GESTURE | none |
| GENDER | female |
| AGE | 30 |
| EMOTION (IMAGE) | sad 0.4 |
| VOICE ID | voice-user1 |
| TEXT | PLAY |
| EMOTION (TEXT) | neutral 0.6 |
| EMOTION (VOICE) | sad 0.8 |

ASSIGN LARGE WEIGHT ON TYPE WITH THE LARGEST CHANGE IN DATA

ELECTRONIC APPARATUS AND CONTROLLING METHOD THEREOF

CROSS-REFERENCE TO RELATED APPLICATION

This application is a Continuation of U.S. application Ser. No. 16/671,518, filed Nov. 1, 2019, which claims priority to KR 10-2018-0133827, filed on Nov. 2, 2018, the entire contents of which are all hereby incorporated herein by reference in their entireties.

BACKGROUND

1. Field

The disclosure relates to an electronic apparatus and a controlling method thereof and for example, to an electronic apparatus that provides response information corresponding to a user voice command using an artificial intelligence learning model from input data and a controlling method thereof.

2. Description of Related Art

In order to perform an operation corresponding to a conventional user voice command, input data is compared with existing data. For example, a recognized user's voice is compared with previously stored data, or a recognized user's behavior is compared with previously stored data. However, there may be a case that the user voice command is not clearly understood only by comparing with the previously stored data.

Accordingly, in a process of recognizing user voice commands, various types of data such as gestures, emotions, etc. in addition to voice may be newly analyzed in order to specifically identify user voice commands. However, there was a problem that it takes a lot of time to recognize when using all the various types of data. In addition, it was difficult to determine which data to use.

SUMMARY

Embodiments of the present disclosure address the problem described above and provide an electronic apparatus that classifies input data by type, determines input data of a specific type from the classified type using the artificial intelligence learning model, and provides information corresponding to a user voice command, and a controlling method thereof.

An example aspect of example embodiments relates to an electronic apparatus including a memory and a processor configured to control the electronic apparatus to: classify a plurality of input data into a plurality of types to store in the memory, determine at least one among the input data of the classified plurality of types based on a voice command being recognized among the input data, and provide response information corresponding to the voice command based on the input data of the determined type.

The processor may determine at least one among the input data of the classified plurality of types based on time information related to the user voice command.

The processor may group the input data classified into the plurality of types by a preset time unit and obtain representative data for each of the plurality of types corresponding to each time unit based on the grouped input to store in the memory, and provide response information corresponding to the voice command based on the representative data of the determined type.

The processor may compare an amount of change in the representative data for each of the plurality of types corresponding to each time unit, and assign a largest weight on a type having a largest amount of change to provide response information corresponding to the voice command.

The plurality of types may include at least one of gesture information, emotion information, face recognition information, gender information, age information or voice information.

The processor may recognize the voice command based on at least one of the gesture information or voice information among the input data.

The processor may, based on the voice command being recognized in the input data, recognize the voice command as a preset voice recognition unit, and determine at least one among the classified plurality of types based on a time interval belonging to at least one voice recognition unit.

The processor may, based on a wake-up word being included in the voice command, recognize the voice command as the preset voice recognition unit based on the time interval where the wake-up word is recognized.

The processor may, based on the response information not being provided based on the input data input for the preset time interval based on the wake-up word being recognized, provide response information corresponding to the voice command using input data input in a previous time interval before the wake-up word is recognized.

The processor may determine at least one among the input data of the classified plurality of types based on information on the user's intention or an object to be controlled which are recognized in the voice command.

An example aspect of example embodiments relates to a method for controlling an electronic apparatus including classifying a plurality of input data into a plurality of types to store in a memory, based on a voice command being recognized among the input data, determining at least one among the input data of the classified plurality of types, and providing response information corresponding to the voice command based on the input data of the determined type.

The determining at least one among input data of the classified plurality of types may include determining at least one among the input data of the classified plurality of types based on time information related to the user voice command.

The storing in the memory may include grouping the input data classified into the plurality of types by a preset time unit and obtaining representative data for each of the plurality of types corresponding to each time unit based on the grouped input to store in the memory, wherein the providing response information corresponding to the voice command includes providing response information corresponding to the voice command based on the representative data of the determined type.

The providing the response information corresponding to the voice command may include comparing an amount of change in the representative value for each of the plurality of types corresponding to each time unit, and assigning a largest weight on a type having a largest amount of change to provide response information corresponding to the voice command.

The plurality of types may include at least one of gesture information, emotion information, face recognition information, gender information, age information or voice information.

The determining at least one among the input data of the classified plurality of types may include recognizing the voice command based on at least one of the gesture information or the voice information among the input data.

The determining at least one among the input data of the classified plurality of types may include, based on a voice command being recognized in the input data, recognizing the voice command as a preset voice recognition unit, and determining at least one among the input data of the classified plurality of types based on a time interval belonging to at least one voice recognition unit.

The determining at least one among the input data of the classified plurality of types may include, based on a wake-up word being included in the user voice command, recognizing the user voice command as the preset voice recognition unit based on the time interval where the wake-up word is recognized.

The providing the response information corresponding to the voice command may include, based on the response information not being provided based on the input data input for the preset time interval based on the wake-up word being recognized, providing the response information corresponding to the user voice command using the input data input in a previous time interval before the wake-up word is recognized.

The determining at least one among the input data of the classified plurality of types may include determining at least one among the input data of the classified plurality of types based on at least one of the user's intention or an object to be controlled which are recognized in the voice command.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 4A, 4B, 4C and 4D are diagrams illustrating an example operation of storing and inputting data by a unit of a predetermined time according to an embodiment of the disclosure;

FIG. 8 is a diagram illustrating an example process of obtaining a representative value of input data in a grouping process according to an embodiment of the disclosure;

FIGS. 10A, 10B, 10C and 10D are diagrams illustrating examples in which a plurality of types, which are selected in accordance with time intervals, are different according to an embodiment of the disclosure;

FIG. 11 is a diagram illustrating examples of providing information corresponding to a user voice command using voice or emotion data according to embodiments of the disclosure;

FIG. 12 is a diagram illustrating an example operation for storing input data temporarily and providing response information corresponding to a user voice command using the temporary input data according to an embodiment of the disclosure;

FIG. 13 is a diagram illustrating an example of providing response information corresponding to a user voice command by applying weights to a plurality of input data according to an embodiment of the disclosure;

DETAILED DESCRIPTION

Figure 1:
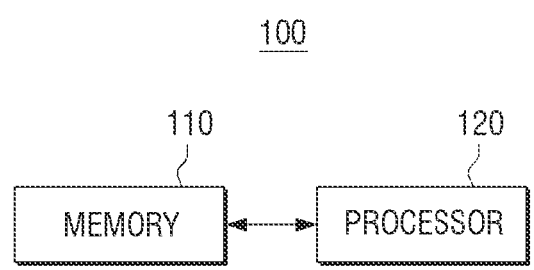
FIG. 1 is a block diagram illustrating an example electronic apparatus according to an embodiment of the disclosure.

Before describing various example embodiments of the disclosure in greater detail, a method for understanding the present disclosure and drawings will be described.

The terms used in embodiments of the present disclosure are selected as general terminologies currently widely used in consideration of the configuration and functions of the present disclosure, but can be different depending on intention of those skilled in the art, a precedent, appearance of new technologies, and the like. Also, there may be some arbitrarily selected terms. Such terms may be understood according to meanings defined in the present disclosure, and may also be understood based on general contents of the present disclosure and a typical technical concept in the art where the terms are not specifically defined.

Also, the same reference numerals or symbols described in the attached drawings may denote parts or elements that actually perform the same functions. For convenience of descriptions and understanding, the same reference numerals or symbols are used and described in different example embodiments. In other words, although elements having the same reference numerals are all illustrated in a plurality of drawings, the plurality of drawings do not necessarily refer to only one example embodiment.

In addition, in order to distinguish between the components, terms including an ordinal number such as "first", "second", etc. may be used in the present disclosure and claims. The ordinal numbers may used to distinguish the same or similar elements from one another, and the use of the ordinal number should not be understood as limiting. The terms used herein are solely intended to explain various example embodiments, and not to limit the scope of the present disclosure. For example, used orders, arrangement orders, or the like of elements that are combined with these ordinal numbers may not be limited by the numbers. The respective ordinal numbers are interchangeably used, if necessary.

The singular expression also includes the plural meaning as long as it does not conflict with the context. The terms "include", "comprise", "is configured to," etc., of the description may be used to indicate that there are features, numbers, steps, operations, elements, parts or combination thereof, and they should not exclude the possibilities of combination or addition of one or more features, numbers, steps, operations, elements, parts or a combination thereof.

The present disclosure may have several embodiments, and the embodiments may be modified variously. In the following description, specific embodiments are provided with accompanying drawings and more detailed descriptions thereof. However, this does not necessarily limit the scope of the example embodiments to a specific embodiment form. Instead, modifications, equivalents and replacements included in the disclosed concept and technical scope of this disclosure may be employed. While describing example embodiments, if it is determined that the specific description regarding a known technology obscures the gist of the disclosure, the specific description may be omitted.

In the example embodiments of the present disclosure, the term "module," "unit," or "part" may be referred to as an element that performs at least one function or operation, and may be implemented with hardware, software, or a combination of hardware and software. In addition, a plurality of "modules," a plurality of "units," a plurality of "parts" may be integrated into at least one module or chip except for a "module," a "unit," or a "part" which has to be implemented with specific hardware, and may be implemented with at least one processor (not shown).

Also, when any part is connected to another part, this includes a direct connection and an indirect connection through another medium. Further, when a certain portion includes a certain element, unless specified to the contrary, another element may be additionally included, rather than precluding another element.

Various portions of various example embodiments of the disclosure may be performed by a machine learning based recognition system, and the disclosure may include a classification system based on a series of machine learning algorithms based on neural networks, and will describe a deep learning based recognition system as an example.

The deep learning based recognition system may include at least one classifier, the classifier may correspond to one or a plurality of processors. The processor may be realized as an array of a plurality of logic gates or may be implemented as a combination of a general microprocessor and a memory in which a program that can be executed in the microprocessor is stored.

The classifier may be implemented as a neural network based classifier, a support vector machine (SVM), an adaboost classifier, a bayesian classifier, a perceptron classifier, or the like. Hereinafter, a classifier of the disclosure may refer, for example, to an embodiment implemented as a convolutional neural network (CNN) based classifier. The neural network based classifier may refer, for example, to a calculation model realized to simulate a calculation power of biological system using a large number of artificial neurons connected by connecting lines, and it may perform human recognition or learning process through the connecting lines having a connection strength (weight). However, the classifier of the disclosure is not limited thereto and will be realized as various classifies described above.

A general neural network may include, for example, and without limitation, an input layer, a hidden layer, and an output layer, and the hidden layer may include one or more layers as necessary. As an algorithm for learning the neural network, a back propagation algorithm may be used.

When any data is input to an input layer of the neural network, the classifier can train the neural network such that output data for an input learning data is output to an output layer of the neural network. When feature information extracted from the input data is input, a pattern of the feature information may be classified into one of several classes and a classification result may be output using the neural network.

The processor may include a classification system based on a series of machine learning algorithms based on the neural network, and can use the deep learning based recognition system.

FIG. 1 is a block diagram illustrating an example electronic apparatus according to an embodiment of the disclosure.

The electronic apparatus 100 may include a memory 100 and a processor (e.g., including processing circuitry) 120.

The electronic apparatus 100 may include, for example, and without limitation, a TV, a desktop PC, a laptop, a smartphone, a tablet PC, a server, or the like. The electronic apparatus 100 may, for example, and without limitation, be implemented as a system itself in which a cloud computing environment is built, that is, a cloud server. In specific, the electronic apparatus 100 may be a device including a deep learning based recognition system. The above-described example is merely an example for describing the electronic apparatus and is not necessarily limited to the above-described device.

The memory 110 may be implemented as an internal memory such as, for example, and without limitation, a ROM (e.g., electrically erasable programmable read-only memory (EEPROM), a RAM included in the processor 120, may be implemented as a separate memory, or the like.

The memory 110 may, for example, store a plurality of input data input sequentially by a plurality of types. An example operation for storing by the plurality of types will be described later in the operation of the processor 120.

A memory embedded in the electronic apparatus 100 may be implemented, for example, and without limitation, as at least one of volatile memory (e.g., dynamic RAM (DRAM), static RAM (SRAM), synchronous dynamic RAM (SDRAM), etc.), non-volatile memory (e.g., one-time programmable ROM (OTPROM), programmable ROM (PROM), erasable and programmable ROM (EPROM), electrically erasable and programmable ROM (EEPROM), mask ROM, flash ROM, flash memory (e.g., NAND flash or NOR flash, etc.), a hard disk drive (HDD), a solid state drive (SSD), a memory detachable from the electronic apparatus 100, or the like, and may be implemented, for example, and without limitation, as a memory card (for example, a compact flash (CF), a secure digital (SD), a micro secure digital (Micro-SD), a mini secure digital (Mini-SD), and an extreme digital (xD), a multi-media card (MMC), etc.), an external memory (e.g., USB memory) connectable to a USB port, or the like.

The processor 120 may include various processing circuitry and perform an overall operation for controlling the electronic apparatus. For example, the processor may function to control the overall operation of the electronic apparatus.

The processor 120 may, for example, and without limitation, be implemented as a digital signal processor (DSP), a microprocessor, a time controller (TCON), or the like but is not limited thereto. The processor may include, for example, and without limitation, one or more among a central processing unit (CPU), a micro controller unit (MCU), a micro processing unit (MPU), a controller, an application processor (AP), a communication processor (CP), ARM processor, or the like, and may be defined as the corresponding terms. In addition, the processor may be implemented as a system on chip (SoC), a large scale integration (LSI) in which processing algorithms are embedded, or a field programmable gate array (FPGA).

Functions related to artificial intelligence (hereinafter referred to as AI) according to the disclosure may be operated through the processor and the memory. The processor may include one or more processors. The one more processors may include, for example, and without limitation, a general purpose processor such as a CPU, an AP, a digital signal processor (DSP), or the like, a graphics dedicated processor such as GPU, a vision processing unit (VPU), an AI dedicated processor such as an NPU, or the like. One or more processors may include various processing circuitry and control the electronic apparatus to process an input data according to a predefined operating rule or AI model stored in the memory. When one or more processors include an AI dedicated processor, the AI dedicated processor may be designed with a hardware structure specialized for processing a specific AI model.

The predefined operating rule or AI model is characterized by being made through learning. Being made through learning may refer, for example, to a basic AI model being trained using a plurality of learning data by a learning algorithm, thereby creating a predefined operation rule or AI model set to perform a desired feature (or purpose). Such learning may be made in a device itself in which AI according to the disclosure is performed, or may be made through a separate server and/or system. Examples of learning algorithms include supervised learning, unsupervised learning, semi-supervised learning, or reinforcement learning, but are not limited to the above examples.

The AI model may include, for example, a plurality of neural network layers. Each of the plurality of neural networks may have a plurality of weight values, and may perform neural network calculation through calculations between a calculation result of a previous layer and a plurality of weights. The plurality of weight values that the plurality of neural network layers have may be optimized by learning results of an AI model. For example, the plurality of weights may be updated to reduce or minimize a loss value or a cost value obtained from the AI model during the learning process. The AI neural networks may include, for example, and without limitation, a deep neural network (DNN), for example, a convolutional neural network (CNN), a deep neural network (DNN), a recurrent neural network (RNN), a restricted boltzmann machine (RBM), deep belief network (DBN), bidirectional recurrent deep neural network (BRDNN), deep Q-networks, and the like, but are not limited to the above examples.

The processor 120 may divide a plurality of input data sequentially input into a plurality of types and store the plurality of types in the memory 110. When a user voice command is recognized among the input data, the processor 120 may determine at least one of the input data of the plurality of types classified based information related to the user voice command. The processor 120 may provide response information corresponding to the user voice command based on the input data of the determined type.

According to another embodiment, in addition to the voice command, e.g., a user voice command, the user command may be input using a motion or a gesture. For example, the processor 120 may have the user command received through an image in addition to the user voice command. In addition, the user voice command described herein may be replaced with a user image command.

The input data may be image data or voice data capable of analyzing a user's behavior. The voice data may be obtained through a microphone of the electronic apparatus 100 and may be received through a microphone of an external device according to an embodiment, and the electronic apparatus 100 may receive the voice data only. In addition, the image data may be obtained from a camera of the electronic apparatus 100, or the like, and receive through a camera of the external device according to an embodiment, and the electronic apparatus 100 may receive the image data only.

The plurality of types may include at least one of gesture information, emotion information, face recognition information, gender information, age information or voice information.

A preset user voice command may be a user's behavior capable of being recognized from the voice data and the image data. The user's behavior may refer, for example, to the user speaking a specific word or taking/making a specific motion. The preset user voice command may be changed according to the user's setting.

The processor 120 may analyze (decide) the user voice command using input data stored in a plurality of types. The processor 120 may analyze the user voice command by selecting (determining) only some types of the plurality of types. The processor 120 may use information related to the user voice command to select some types among the plurality of types. The information related to the user voice command may refer to any and all behaviors or actions of user that can be recognized from voice data and image data. The processor 120 may recognize the user's behavior or action using voice data and image data, and obtain a recognized result as the user's information. In addition, the processor 120 may classify the obtained user information and input data as a plurality of types, and store them. The processor 120 may analyze the user voice command using some types among the plurality of types.

The processor 120 may use the AI learning model to select some types of the plurality of types. In more detail, in case of a specific event, the AI learning model may be used in a process of calculating an analysis recognition rate by selecting any type. The processor 120 may control the electronic apparatus to determine a type for which the highest recognition rate is expected using the AI learning model.

The AI learning model may compare input data corresponding to the user voice command to response information corresponding to the actual user voice command in order to analyze the user voice command. If the input data is compared with the response information corresponding to the user voice command, it may be possible to analyze based on which type of a plurality of types described above the user voice command has the highest recognition rate.

When analyzing a type based on a pre-stored input data classified into a plurality of types, the AI learning model may learn which type has the highest recognition rate and obtain a criterion by determining a type having the highest recognition rate. In addition, when a new input data is received, a recognition rate may be obtained by applying the new input data to a previous criterion. The AI learning model may determine whether it has a high recognition rate as before, even when the criterion in which the new input data is applied changed.

If the recognition rate of the new input data is higher than that of the existing criterion, the AI learning model may change the existing criterion. In addition, whenever a new input data is received, the described process may be repeated. After determining a final criterion according to another embodiment, an operation of comparing a recognition rate may be performed in every preset number of input data reception.

The processor 120 may determine at least one among input data of a plurality types classified based on time information related to the user voice command.

The processor 120 may classify audio data and image data according to time information. For example, if a user utters "Bixby, turn on the air conditioner over there", the voice data may obtain information corresponding to "Bixby", "over there", "air conditioner, and "turn on" in accordance with time. In addition, the image data corresponding to the corresponding to the time may be obtained. The processor 120 may classify input data by matching the voice data and image data corresponding to the time information or the time interval. In addition, the user voice command may be analyzed by classifying voice data and image data.

The processor 120 may analyze user information corresponding to a specific time interval based on the time information. The corresponding operation will be described in greater detail below with reference to FIG. 5.

The processor 120 may group input data classified as a plurality of types by a predetermined time unit, obtain representative data for each type corresponding to each time unit based on the grouped input, and stores the representative data for each type in the memory 110, and provide response information corresponding to the user voice command based on the representative data of the determined type.

The grouping operation may refer, for example, to an operation of arranging a plurality of data and converting the data into one data. In addition, the grouping operation may refer, for example, to an operation of converting a plurality of data into one representative value (or representative data). For example, assuming that 10 input data are received from 1 second to 10 seconds, the input data received for 10 seconds may be grouped and converted into one input data. The one input data may be a representative value (or representative data).

The representative data may be one or more. For example, assuming 20 input data received every second are received, two groups and two representative values may exist when the grouping operation is performed in units of 10 seconds. In addition, the processor 120 may analyze the user voice command using the two representative values. Analyzing the user voice command may refer, for example, to the processor 120 obtaining response information corresponding to the user voice command.

An operation of obtaining a representative value may use any one of a maximum value, a minimum value and an average value among a plurality of input data according to time order. In addition, the representative value may be an adding operation of a plurality of data. For example, assuming that there are four text information "Bixby", "over there", "air conditioner" and "turn on", the processor 120 may convert it into one text information "Bixby, turn on the air conditioner over there" through the grouping operation.

The processor 120 may, for example, analyze the user's voice and perform the grouping operation on the interval where the user actually speaks. In general, the voice data may include both an interval where the user uttered and an interval where the user did not utter. The processor 120 may distinguish an interval where the wake-up word is recognized or an interval thereafter in order to shorten a processing time. The processor 120 may perform the grouping operation on the distinguished specific intervals.

Meanwhile, the grouping operation will be described in greater detail below with reference to FIGS. 7 and 8.

The processor 120 may compare the amount of change in representative data for each type corresponding to each time unit, assign the largest weight to a type having the largest amount of change, and provide response information corresponding to the user voice command. The operation of assigning weight will be described in greater detail below with reference to FIG. 13.

The processor 120 may recognize the user voice command based on at least one of gesture information or voice information among input data.

The user voice command may be analyzed using voice data and image data. The voice and image data may include information for analyzing a user's command. For example, an object to be controlled and control command may be included, and the user may make a specific motion corresponding to the object to be controlled and the control command.

In addition, when the user voice command is recognized in the input data, the processor 120 may recognize the user voice command as a preset voice recognition unit, and determine at least one among the plurality of input data classified by the plurality of types based on a time interval belonging to at least one voice recognition unit.

When the wake-up word is included in the user voice command, the processor 120 may determine a time interval where the wake-up word is included and an uttered interval thereafter, and analyze the user voice command using the input data included in the determined intervals.

When the wake-up word is included in the user voice command, the processor 120 may determine the user voice command as the preset voice recognition unit based on the time interval where the wake-up word is recognized.

An end point detection (EPD) operation may be performed to determine an interval where the user utters or a preset voice recognition unit, and a detailed operation will be described in greater detail below with reference to FIG. 5.

According to another embodiment, the preset voice recognition unit may be a preset time interval. For example, when a time interval is set as 0.2 seconds, the processor 120 may analyze voice data including the wake-up word as the preset voice recognition unit (0.2 seconds).

When response information cannot be provided based on the input data input during the preset time interval after the wake-up word is recognized, the processor 120 may use the input data input in all time interval before the wake-up word is recognized and provide the response information corresponding to the user voice command.

When the processor 120 does not recognize the input data corresponding to a specific time interval, the processor 120 may analyze the user voice command using the input data corresponding to the previous time interval. An operation of using input data corresponding to a previous time interval will be described in greater detail below with reference to FIG. 12.

The processor 120 may determine at least one of the input data of the plurality of types classified based on at least one of information on a user's intention or an object to be controlled recognized from the user voice command. When a preset word included in the user's voice is recognized, the processor 120 may analyze the user's command using a type corresponding to a preset word. For example, when the user utters "Bixby", the processor 120 may select only a type related to voice recognition and analyze the user voice command. Specific operations will be described in greater detail below with reference to FIGS. 9 and 10.

The electronic apparatus 100 according to the disclosure, may receive voice data and image data and analyze a user's behavior. The electronic apparatus 100 may store voice data and image data as input data for each type. In addition, when a specific event occurs, the "electronic apparatus" may analyze the user voice command using a type corresponding to the specific event. Since a specific type of data is used instead of using all the data, the electronic apparatus 100 may shorten a processing time. In addition, since only the type corresponding to the specific event is used, only the data of a required area (type) may be reflected in a result. Accordingly, the electronic apparatus 100 of the disclosure may expect an improvement in a recognition rate for the user voice command.

Figure 2:
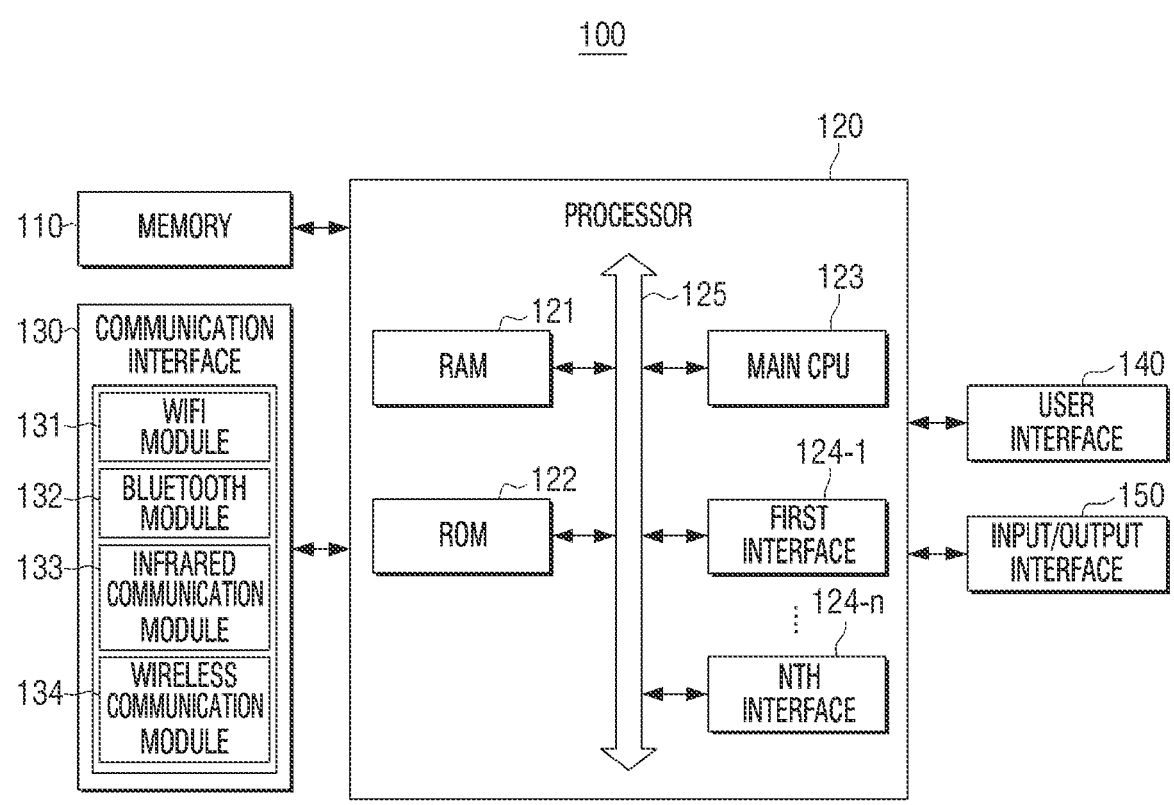
FIG. 2 is a block diagram illustrating an example configuration of an example electronic apparatus of FIG. 1.

FIG. 2 is a block diagram illustrating an example configuration of an example electronic apparatus of FIG. 1.

Referring to FIG. 2, the electronic apparatus 100 according to an embodiment may include a memory 110, a processor (e.g., including processing circuitry) 120, a communication interface (e.g., including communication circuitry) 130, a user interface (e.g., including user interface circuitry) 140, and an input/output interface (e.g., including input/output circuitry) 150.

Repeated descriptions of the same operations of the memory 110 and the processor 120 as the operations described above may not be repeated here.

The processor 120 may include various processing circuitry and controls the overall operations of the electronic apparatus 100 using various programs stored in the memory 110.

For example, the processor 120 may include a random access memory (RAM) 121, a read only memory (ROM) 122, a main central processing unit (CPU) 123, first to nth interfaces 124-1 to 134-n, and a bus 125.

In this example, the RAM 121, the ROM 122, the CPU 123, the first to nth interfaces 124-1 to 134-n, and so on may be connected with each other through the bus 125.

The ROM 122 stores a set of instructions for system booting. If a turn-on command is input and the power is supplied, the main CPU 123 copies the O/S stored in the memory 110 into the RAM 121 according to the command stored in the ROM 122, and boots the system by executing the O/S. In response to the booting being completed, the main CPU 123 may copy various application programs stored in the memory 110 to the RAM 121, and execute the application programs copied to the RAM 121 to perform various operations.

The main CPU 123 accesses the memory 110 to perform booting using the O/S stored in the memory 110. The CPU 1013 may perform various operations using the various programs, contents, data, and the like stored in the memory 110.

The first to nth interfaces 124-1 to 134-n may be concatenated with the aforementioned various components. One of the interfaces may be network interface which is connected to an external apparatus via a network.

The processor 120 may perform a graphics processing function (video processing function). For example, the processor 120 may generate a screen including various objects such as an icon, an image, a text, etc. using a calculator (not shown) and a renderer (not shown). The calculator (not illustrated) may calculate attribute values, such as coordinate values at which each object will be represented, forms, sizes, and colors according to a layout of the screen, based on the received control instruction. The renderer (not illustrated) may generate screens of various layouts including the objects based on the attribute values which are operated by the operator (not illustrated). The processor 120 may perform various image processing processes such as decoding, scaling, noise filtering, frame rate conversion, and resolution conversion on video data.

The processor 120 may perform processing on audio data. For example, the processor 120 may perform various processes, such as decoding, amplification, and noise filtering of the audio data.

The communication interface 130 may include various communication circuitry and be an element that communicates with various external apparatuses according to various types of communication methods. The communication interface 130 may include various communication circuitry included in various communication modules, such as, for example, and without limitation, a Wi-Fi module 131, a Bluetooth module 132, an infrared communication module 133, a wireless communication module 134, and so on. The processor 120 may perform the communication with various external apparatuses using the communication interface 130. The external apparatus may include, for example, and without limitation, a display device such as a TV, an image processing device such as a set-top-box, an external server, a control device such as a remote control, an audio output device such as a Bluetooth speaker, a lighting device, a smart cleaner, home appliances such as a smart refrigerator, a server such as IOT home managers, and the like.

The Wi-Fi module 131 and the Bluetooth module 132 may perform communication using a Wi-Fi method and a Bluetooth method, respectively. In the case of using the Wi-Fi module 131 or the Bluetooth module 132, connection information such as a service set identifier (SSID) and a session key may be received and transmitted first, and communication may be connected using the connection information, and then, various information may be received and transmitted.

The infrared communication module 133 may perform communication according to infrared data association (IrDA) technology that transmits data wirelessly to a short distance using infrared rays between time light and millimeter wave.

The wireless communication module 134 may refer, for example, to a module that performs communication according to various communication standards, such as a zigbee, 3rd Generation (3G), 3rd Generation Partnership Project (3GPP), Long Term Evolution (LTE), LTE-A, 4G (4th Generation), 5G (5th Generation), and the like, in addition to the Wi-Fi module 131 and the Bluetooth module 132 described above.

The communication interface 130 may include at least one of a local area network (LAN) module, an Ethernet module, or a wired communication module performing communication using a pair cable, a coaxial cable, or an optical fiber cable.

According to an embodiment, the communication interface 130 may use the same communication module (e.g., a Wi-Fi module) to communicate with an external apparatus and an external server such as a remote controller.

According to another embodiment, the communication interface 130 may use a different communication module (e.g., a Wi-Fi-module) to communicate with an external apparatus and external server such as a remote controller. For example, the communication interface 130 may use at least one of the Ethernet module or the Wi-Fi module to communicate with an external server, and may use a BT module to communicate with an external apparatus such as a remote controller.

However, this is only an example and the communication interface 130 may use at least one communication module among various communication modules in the case of communicating with a plurality of external apparatuses or external servers.

The communication interface 130 may further include a tuner and a demodulator according to an embodiment.

The tuner (not shown) may receive an RF broadcast signal by tuning a channel selected by a user or all channels stored in advance among radio frequency (RF) broadcast signals through an antenna.

The demodulator (not shown) may receive and demodulate a digital IF signal (DIF) converted by the tuner and perform channel decoding.

The user interface 140 may include various user interface circuitry and may, for example, and without limitation, be implemented as a device such as a button, a touch pad, a mouse, a keyboard and the like, or may be implemented as a touch screen that can also perform the above-described display function and operation unit function. The button may be various types of buttons, such as a mechanical button, a touch pad, a wheel, etc. which are formed on any region, such as the front, side, or rear of the main body of the electronic apparatus 100.

The input/output interface 150 may include various input/output circuitry and may, for example, and without limitation, be one or more of a high definition multimedia interface (HDMI), a mobile high-definition link (MHL), a universal serial bus (USB), a display port (DP), a thunderbolt, a video graphics array (VGA) port, an RGB port, a D-subminiature (D-SUB), a digital visual interface (DVI), or the like.

The HDMI may refer, for example, to an interface capable of transmitting high-performance data for AV devices that input and output audio and video signals. The DP may refer, for example, to an interface capable of realizing 1920×1080 full HD, ultra-high resolution screens such as 2560×1600 or 3840×2160, and 3D stereoscopic images, and digital audio. The thunderbolt may, for example, refer to an input/output interface for transmitting and connecting a high-speed data, and can connect a PC, a display, a storage device, etc. in one port in parallel.

The input/output interface 150 may input/output at least one among the audio and video signals.

According to an embodiment, the input/output interface 150 may include a port for inputting/outputting only an audio signal and a port for inputting/outputting only a video signal as separate ports, or may be implemented as one port for inputting/outputting both the audio signal and the video signal.

The electronic apparatus 100 may be implemented as a device which does not include a display to transmit the video signal to a separate display device.

The electronic apparatus 100 may transmit a corresponding voice signal to an external server for voice recognition of the voice signal received from the external device.

For example, the communication module for communicating with the external device and the external server may be the same as the Wi-Fi module.

The communication module for communicating with the external device and the external server may be implemented separately. For example, the external device may communicate with a Bluetooth module and the external server may communicate with an Ethernet modem or a Wi-Fi module.

The electronic apparatus 100 according to an embodiment may transmit a digital voice received to a voice recognition server. In this example, the voice recognition server may convert the digital voice signal to text information using speech-to-text (STT). In this example, the voice recognition server may transmit text information to another server or the electronic apparatus to perform a search corresponding to the text information. In some cases, the voice recognition server may directly perform a search.

The electronic apparatus 100 according to another embodiment may directly apply the STT function to the digital voice signal, convert the text information into text information, and transmit the converted text information to an external server.

The components illustrated in FIG. 2 may further include a display and a speaker.

The display may be implemented as various types of displays, such as, for example, and without limitation, a liquid crystal display (LCD), an organic light emitting diodes (OLED) display, a plasma display panel (PDP), or the like. The display may include a driving circuit, a backlight unit, etc. which may be implemented in the form of an a-si TFT, a low temperature poly silicon (LTPS) TFT, an organic TFT (OTFT), or the like. The display may be implemented as a touch screen, a flexible display, a 3D display, or the like combined with a touch sensor.

In addition, the display according to an embodiment may include not only a display panel for outputting an image but also a bezel housing the display panel. For example, the bezel according to an embodiment may include a touch sensor (not shown) for detecting a user interaction.

The speaker may be a component that outputs not only various audio data processed by the input/output interface 150, but also various notice sounds or voice messages.

The electronic apparatus 100 may further include a microphone (not shown). The microphone may, for example, refer to a configuration for receiving and converting a voice of a user or other sounds into the audio data. In this example, the microphone may convert and transmit a received analog user voice signal to the electronic apparatus 100.

The microphone (not shown) may receive the user voice in an activated state. For example, the microphone may be formed integrally with the upper side, the front side, or the side of the electronic apparatus 100. The microphone may include various configurations, such as a microphone for collecting user voice in analog form, an amplifier circuit for amplifying collected user voice, A/D conversion circuit for sampling and converting amplified user voice to digital signal, a filter circuit for removing noise component from converted digital signal, or the like.

Figure 3:
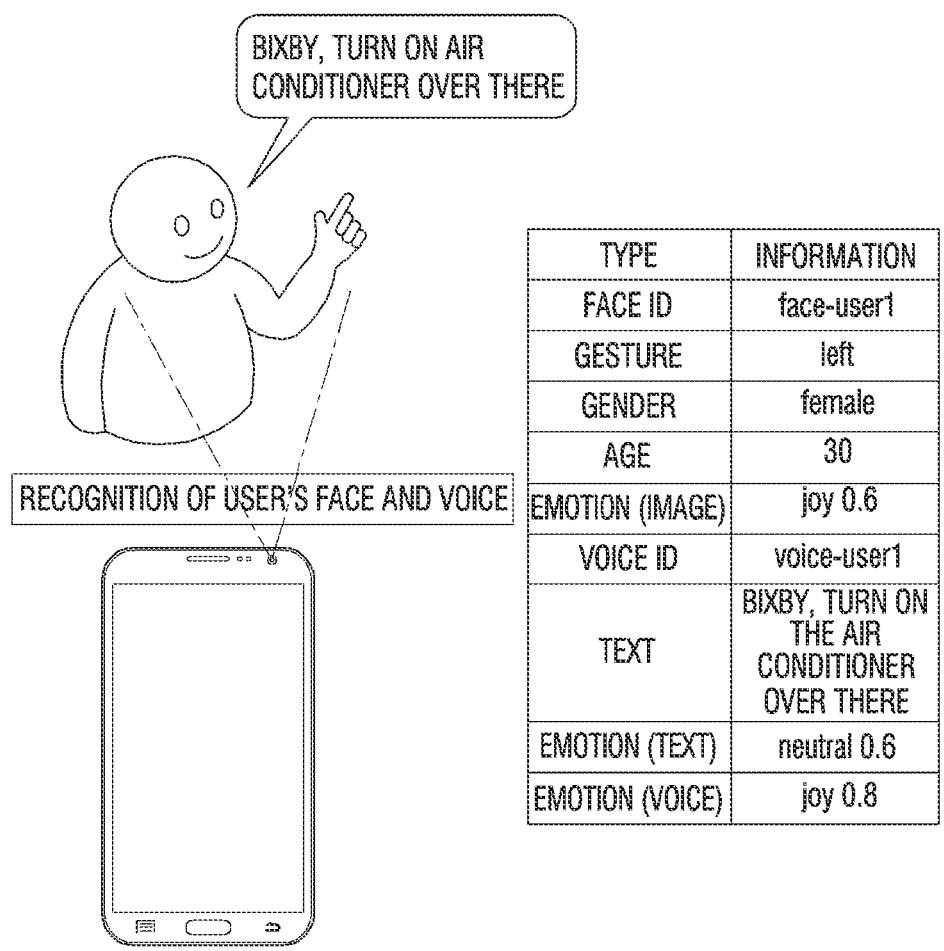
FIG. 3 is a diagram illustrating an example operation of classifying and storing input data according to types according to an embodiment of the disclosure.

FIG. 3 is a diagram illustrating an example operation of classifying and storing input data according to types according to an embodiment of the disclosure.

The electronic apparatus 100 may recognize both voice data and image data of users. For example, the electronic apparatus 100 may receive user's speech through the microphone. In addition, the electronic apparatus 100 may receive an appearance of users through a camera.

For example, when a user utters "Bixby, turn on air conditioner over there" while pointing his/her hand toward a certain direction, the electronic apparatus 100 may recognize the user's behavior using a microphone and a camera.

The electronic apparatus 100 may receive audio data and video data as input data. The electronic apparatus 100 may store the received input data for each of a plurality of types. For example, the electronic apparatus 100 may classify and store the input data into face ID, gesture, gender, age, emotional (image), voice ID, text, emotional (text), and emotional (voice).

The face ID may refer to a unique ID according to the user's face, and the electronic apparatus 100 may obtain a face ID using a method of determining a unique characteristic of the user, such as an iris or outline of the face.

The gesture may refer to an operation of pointing a specific direction or taking a specific motion using the user's hand, finger or arm.

The text may refer to a result of converting voice data spoken by the user into text.

The emotional (video) may refer to the user's emotional state recognized through the video, and the motion (text) may refer to the user's emotional state analyzed using only the text result. In addition, the emotional (voice) may refer to the user's emotional state analyzed using only the voice data.

The type corresponding to the face ID, the gesture, and the emotional (video) may be a result of analysis using the video data, and the type corresponding to the voice ID, the text, the emotional (text), the emotional (voice) may be a result of analysis using the voice data.

The type corresponding to gender and age may be a result of analysis using at least one of the voice data or video data.

Referring to FIG. 3, the electronic apparatus 100 may store the face ID as face-user 1 and the gesture as left. The left may indicate that the direction pointed by the user's finger is left. According to another embodiment, a name of a specific motion may be stored. In addition, the electronic apparatus 100 may store a gender as a female, an age as 30, and an emotional (video) as joy 0.6. The joy 0.6 may describe at least one of a value representing an emotional state or a probability corresponding to the emotional state. In addition, the electronic apparatus 100 may store a voice ID as voice-user 1, a text as "Bixby, turn on the air conditional over there", an emotional (text) as neutral 0.6, and an emotional (voice) as joy 0.8.

The electronic apparatus 100 may distinguish and describe the face ID and the voice ID, but may determine as the same user, substantially. When the face ID and the voice ID are not matched, the electronic apparatus 100 may notice that the analysis is wrong and perform the recognition operation again.

FIGS. 4A, 4B, 4C and 4D are diagrams illustrating an example operation that stores input data by a unit of a predetermined time according to an embodiment of the disclosure.

Referring to FIGS. 4A, 4B, 4C and 4D, the electronic apparatus may be in a state of storing input data in, for example, a time sequence. For example, if an embodiment that a user utters "Bixby, turn on the air conditioner over there" is supposed, the input data may be stored based on the time sequence uttered by the user.

The electronic apparatus 100 may recognize that a user utters "Bixby" in the interval illustrated in FIG. 4A, "over there" in the interval illustrated in FIG. 4B, "air conditioner" in the interval illustrated in FIG. 4C, and "turn on" in the interval illustrated in FIG. 4D based on voice data.

In addition, the electronic apparatus 100 may not recognize a special gesture operation in the interval illustrated in FIG. 4A, and recognize a gesture operation pointing at the left sides in the intervals illustrated in FIGS. 4B, 4C and 4D based on video data.

In addition, the electronic apparatus 100 may recognize that a user's emotion corresponds to joy in the intervals illustrated in FIGS. 4A and 4B, and neutral in intervals illustrated in FIGS. 4C and 4D based on the video data. In addition, the electronic apparatus may recognize that the user's emotion corresponds to joy in the interval illustrated in FIG. 4A and may not recognize the user's emotion in the interval illustrated in FIG. 4B, and may recognize that the user's emotion corresponds to joy in the intervals illustrated in FIGS. 4C and 4D based on the voice data.

Referring to FIGS. 4A, 4B, 4C and 4D, the electronic apparatus 100 may receive input data according to a time interval and analyze a type according to each time interval differently. For example, the electronic apparatus may receive the user's action changed according to the time interval as data, and analyze it according to the time interval to store the same.

Figure 5:
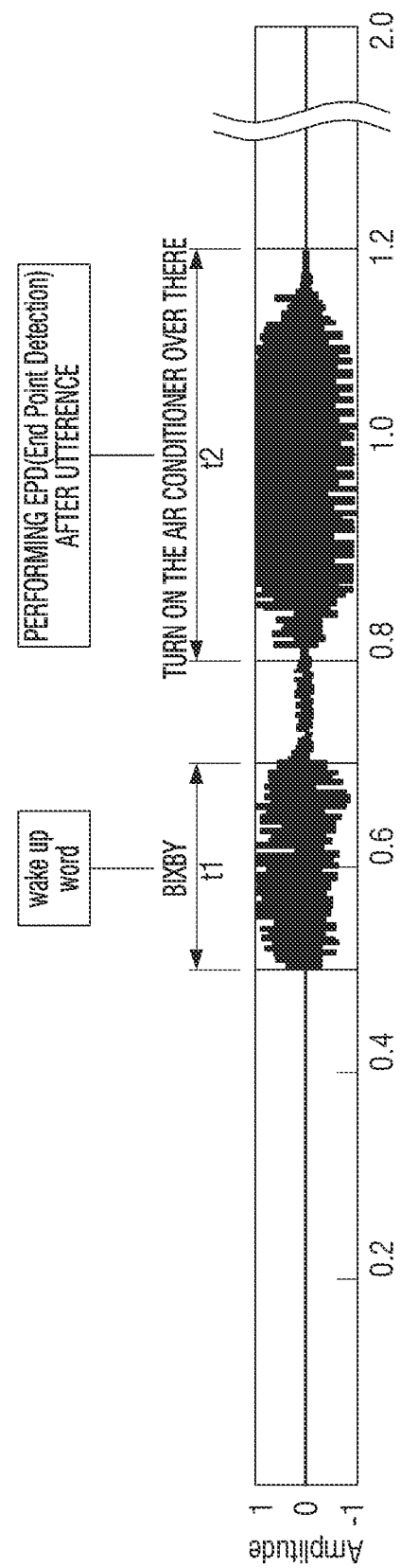
FIG. 5 is a diagram illustrating an example process of classifying input data based on time information according to an embodiment of the disclosure.

FIG. 5 is a diagram illustrating an example process of classifying input data based on time information according to an embodiment of the disclosure.

Referring to FIG. 5, the electronic apparatus 100 may distinguish voice uttered by a user based on time information. For example, it is supposed that the user's voice data is received for two seconds and the user utters "Bixby, turn on the air conditioner over there."

The voice data corresponds to 2 seconds, but time interval actually uttered by the user actually may be less than 2 seconds. Referring to FIG. 5, the time interval actually uttered by the user may be between 0.4 to 1.2 seconds. The time for not uttering voice between "Bixby" and "turn on the air conditioner over there" may be included. The electronic apparatus 100 may determine time interval actually uttered by the user. The electronic apparatus 100 may analyze the voice data and determine an interval where amplitude of waveform for sound is continuously greater than an arbitrary value as one interval.

For example, the electronic apparatus may determine a time point from which an amplitude of waveform of sound is greater than an arbitrary value to a time point which is less than the arbitrary value as one interval (t1). In addition, the electronic apparatus 100 may determine a time point from which the amplitude of waveform of sound is greater than an arbitrary value to a time point which is less than the arbitrary value as a new interval (t2).

As a result, the electronic apparatus 100 may determine time intervals (t1 and t2) classified by analyzing voice data.

Referring to FIG. 5, when the electronic apparatus recognizes a wake-up word, it may analyze utterance afterwards. For example, assuming that the electronic apparatus 100 stores Bixby as a wake-up word, and when the user utters "Bixby, turn on the air conditioner over there", the electronic apparatus 100 may recognize Bixby as the wake-up word and perform an operation of the end point detection (EPD) on a subsequent utterance of the user. That is, the electronic apparatus 100 performs the EPD operation after recognizing the wake-up word, Bixby, so that it may classify a time interval corresponding to t2 separately.

Figure 6:
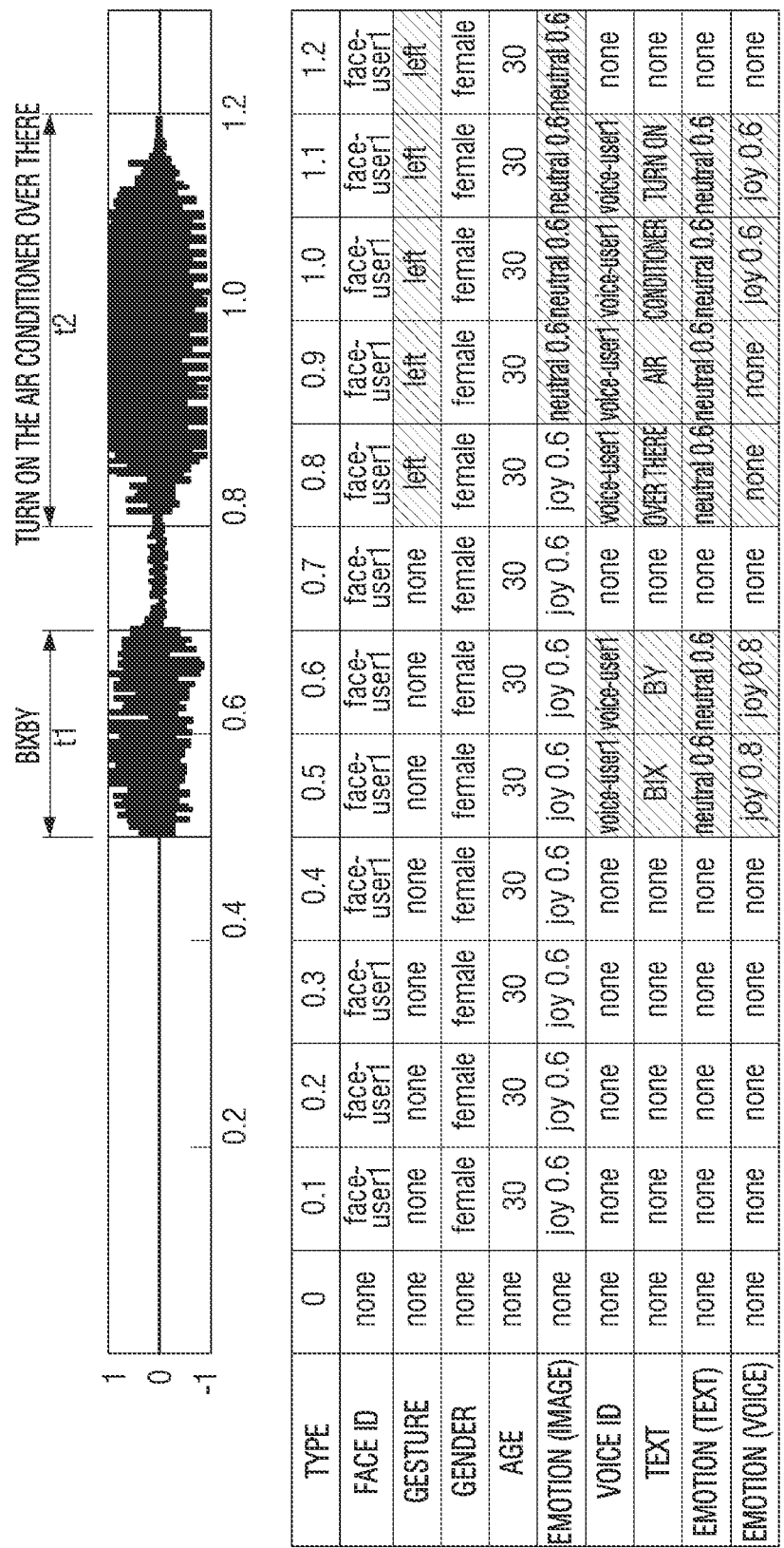
FIG. 6 is a diagram illustrating an example in which contents stored in input vary with time according to an embodiment of the disclosure.

FIG. 6 is a diagram illustrating an example of contents stored in input data vary with time according to an embodiment of the disclosure.

Referring to FIG. 6, the electronic apparatus 100 may classify and store input data according to a plurality of types in accordance with a time sequence. The electronic apparatus 100 may recognize that a user points to the left with a finger from 0.8 second or later and may be stored as left in a gesture area. The electronic apparatus 100 may recognize that the user's emotional state corresponds to joy between 0.1 and 0.8 seconds based on an image data, and that the user's emotional state corresponds to neutral between 0.9 to 1.2 seconds. According to another embodiment, the electronic apparatus may store a probability corresponding to the emotional state.

The electronic apparatus 100 may store text information according to time based on voice data. The electronic apparatus 100 may classify and store text information corresponding to "Bixby, turn on the air conditioner over there" in accordance with a time interval. The "Bixby" text information corresponding to 0.5 second may actually be text information obtained from voice data corresponding to between 0.5 to 0.6 seconds.

Referring to FIG. 6, the electronic apparatus 100 may classify and store the plurality of types using input data received in accordance with the time sequence.

Figure 7:
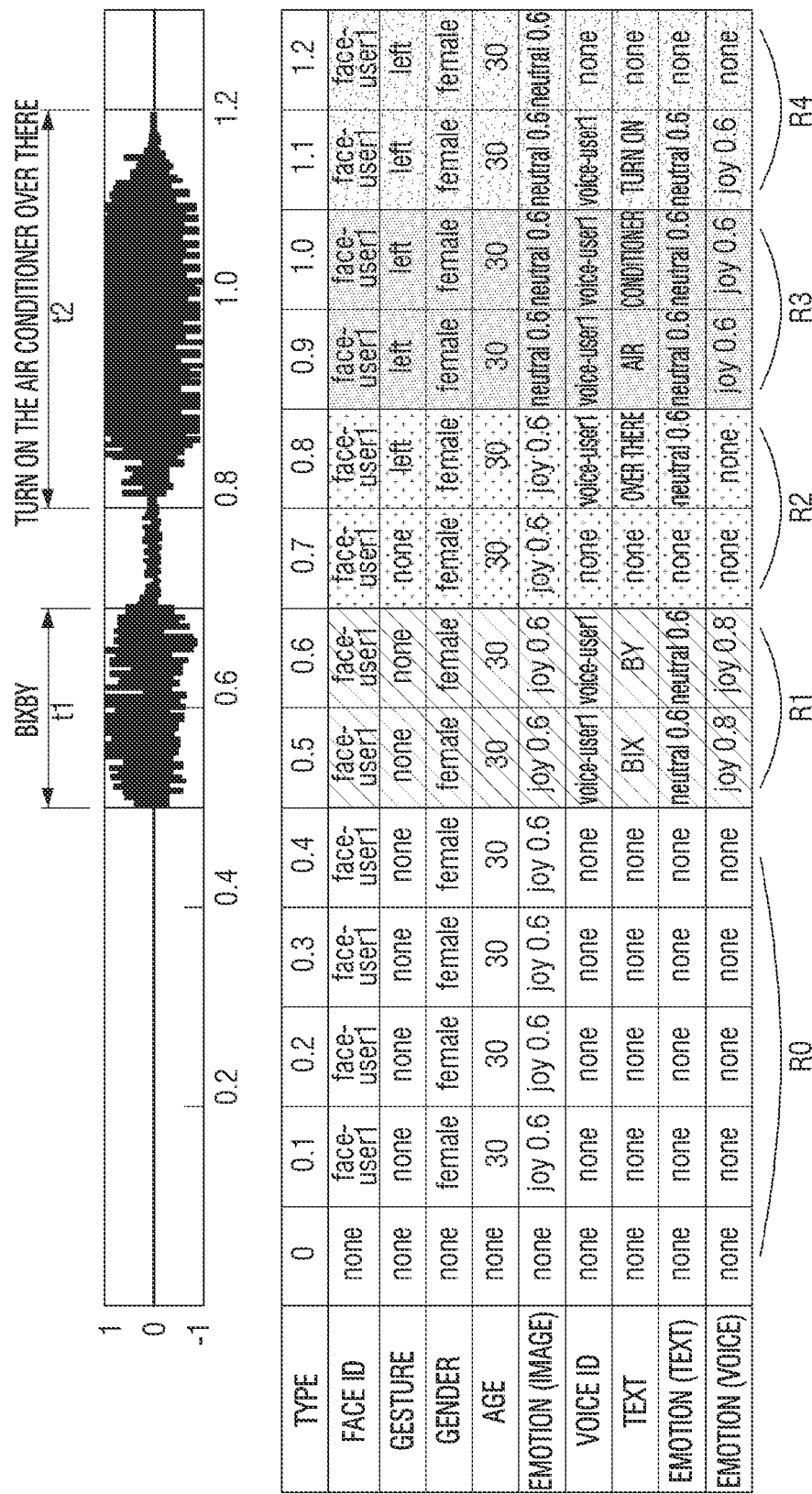
FIG. 7 is a diagram illustrating an example operation of grouping input data into a predetermined time interval according to an embodiment of the disclosure.

FIG. 7 is a diagram illustrating an example operation of grouping input data into a preset time interval according to an embodiment of the disclosure.

As for FIG. 7, it assumes, for convenience of illustration and explanation, that a user's voice is uttered between 0.5 to 1.3 seconds and a preset time interval is 0.2 seconds.

The electronic apparatus 100 is able to distinguish an interval (0.5 to 1.2 seconds, R1, R2, R3 and R4) from which the user's voice is actually recognized and an interval (0 to 0.5 seconds, R0) from which the user's voice is not recognized. In addition, the electronic apparatus 100 may divide the intervals (0.5 to 1.2 seconds) where the user's voice is recognized into the preset time interval (0.2 seconds). The electronic apparatus 100 may group the intervals where the user's voice is recognized at 0.2 second intervals. Specifically, the electronic apparatus 100 may group 0.5 to 0.7 seconds into interval R1, 0.7 to 0.9 seconds into interval R2, 0.9 to 1.1 seconds into interval R3, and 1.1 to 1.3 seconds into interval R4.

The electronic apparatus 100 may simplify the input data by performing a grouping operation. When storing input data in accordance with all time, processing time and storage space can be wasted. Accordingly, the electronic apparatus 100 may simplify a process of storing input data through the grouping operation.

In order to simplify the data storing process through the grouping operation, a process of organizing data is required, and the operation for organizing data will be described in greater detail below with reference to FIG. 8.

FIG. 8 is a diagram illustrating an example process of obtaining a representative value of input data in a process of grouping according to an embodiment of the disclosure.

Data corresponding to R1, R2, R3 and R4 illustrated in FIG. 8 may refer, for example, to data obtained through the grouping process according to FIG. 7. The electronic apparatus 100 may group input data by a preset time interval, and obtain a representative value for each type of information on the grouped time intervals. For example, there are two input data information for each type in an interval corresponding to R1 in FIG. 7. The electronic apparatus 100 may obtain one representative value for each type using the two data. Meanwhile, according to another embodiment, the electronic apparatus 100 may obtain a representative value using two or more data. The number of data used in obtaining the representative value may be adjusted by changing the preset time interval (0.2 seconds).

The electronic apparatus 100 may obtain a representative value using any one of an average value, a minimum value and a maximum value of a plurality of grouped input data. In addition, when only a portion of the plurality of grouped input data exists, the electronic apparatus 100 may exclude a portion of the input data that does not exist and obtain a representative value only with the input data.

The electronic apparatus 100 may obtain the representative value by summing the plurality of grouped input data. For example, in the R1 interval of FIG. 7, text information may be stored by dividing "Bix" and "by". The electronic apparatus 100 may obtain "Bixby" by combining the text information of "Bix" and "by", and store "Bixby" as a representative value.

According to another embodiment, various methods may be applied to the electronic apparatus 100, and the electronic apparatus 100 is not limited to the embodiments described above.

Figure 9:
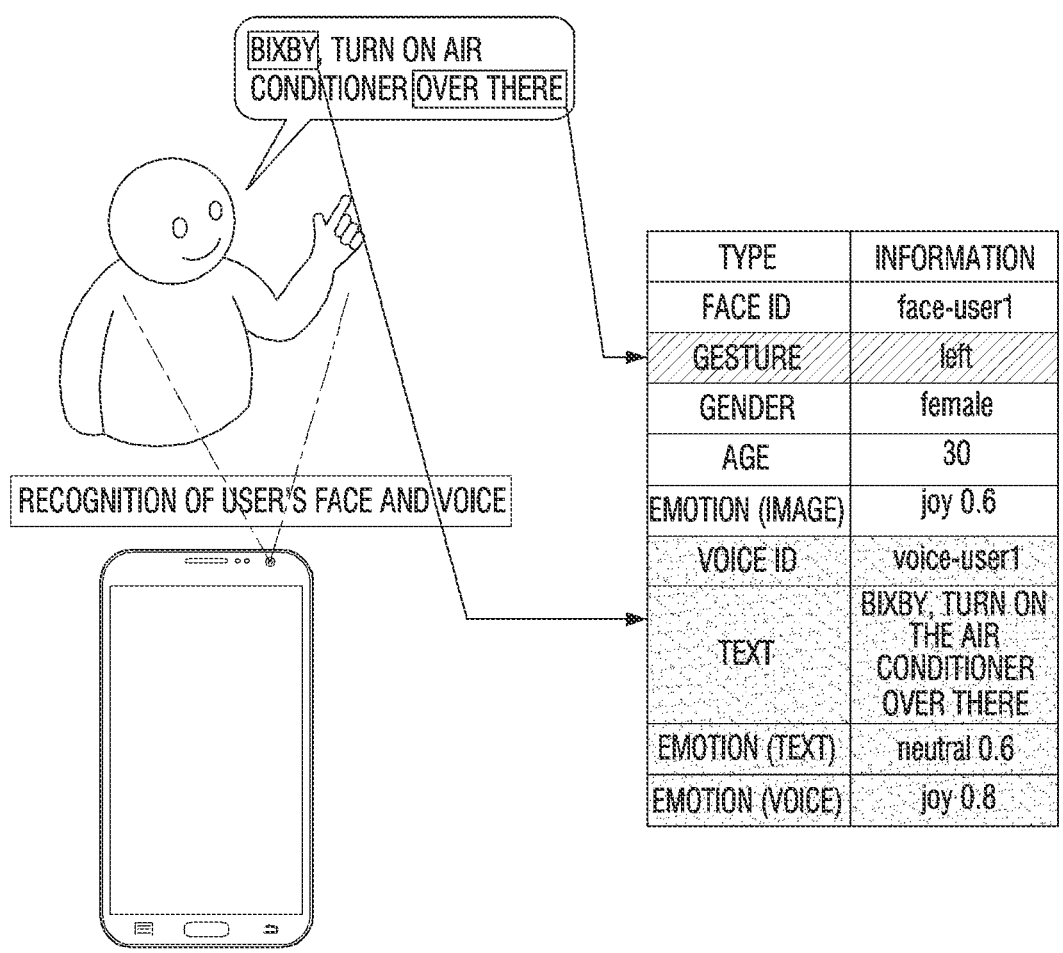
FIG. 9 is a diagram illustrating an example operation of selecting some of a plurality of types according to a preset data according to an embodiment of the disclosure.

FIG. 9 is a diagram illustrating an example operation of selecting some of a plurality of types according to a preset data according to an embodiment of the disclosure.

Referring to FIG. 9, if a received input data matches a preset data, the electronic apparatus 100 may determine a type corresponding to the preset data. For example, assume, for ease of description and illustration, a user utters "Bixby, turn on the air conditioner over there." When text information of Bixby is recognized, the electronic apparatus 100 may provide response information corresponding to a user voice command based on a type corresponding to voice ID, text information, emotional (text), and emotional (voice) among input data. The electronic apparatus 100 may analyze that the "Bixby" is related to a voice recognition device and provide response information corresponding to the user voice command using only a type related to the voice data.

In addition, when the text information of "over there" is recognized, the electronic apparatus 100 may provide response information corresponding to the user voice command using a gesture type. The electronic apparatus 100 may determine that the word "over there" refers to a direction or the like, and may provide response information corresponding to the user voice command using the gesture type which is a type related to a direction.

When text information recognized in voice data is recognized as at least one word of "there, here, that, this, left side, right side, east, west, south, north, up, down, left and right", the electronic apparatus 100 may provide response information corresponding to the user voice command using a gesture type.

The disclosure is not limited to the embodiments described above, the electronic apparatus 100 may provide response information corresponding to the user voice command using other types in accordance with a word set by a user.

In addition, the electronic apparatus 100 may use an AI learning model to determine a type corresponding to a word set by a user. For example, except that a user designates a preset word and a type corresponding to the preset word, the AI learning model may directly match the preset word and the type corresponding to the preset word, except that a user designates a preset word and a type corresponding to the preset word.

The AI learning model may obtain a criteria of determination based on a plurality of pre-stored input data. The AI learning model may analyze a relation between a specific word and a type based on a large amount of input data. For example, a word corresponding to Bixby may not be significantly affected by gender or age types in obtaining response information corresponding to the user voice command. On the other hand, when a word corresponding to Bixby is uttered by a user, voice ID, text, emotional (text) and emotional (voice) types may have a huge amount of influence over a result. The AI learning model may compare the word "Bixby" to all of the plurality of types and determine with a criterion for analyzing the user voice command by selecting only a type having a specific weight or more.

The artificial intelligence learning model may determine a criterion to select the type having the highest recognition rate by comparing various words and a plurality of types in addition to the Bixby word described above.

Since the electronic apparatus 100 selectively uses a type corresponding to the preset text information, it may improve a data processing speed. For example, when analyzing data in a conventional manner, all types of data should be analyzed. However, when selectively using some types as described in FIG. 9, the data processing speed may be improved. In addition, since a result is obtained by reflecting only a data required by a user, a recognition may be increased.

FIGS. 10A, 10B, 10C and 10D are diagrams illustrating examples in which a plurality of types, which are selected in accordance with time intervals, are different according to an embodiment of the disclosure.

FIGS. 10A, 10B, 10C and 10D are diagrams illustrating an embodiment according to FIG. 9. For example, the electronic apparatus 100 may receive input data corresponding to user's utterance in the order of FIGS. 10A, 10B, 10C and 10D.

Input data for each time step disclosed in FIGS. 10A-10D may be partially the same as the embodiment disclosed in FIG. 4. Referring to FIG. 10A-10D, the electronic apparatus 100 may differently determine some of a plurality of types for each time interval according to text information included in the user's utterance and time intervals. For example, if a user utters Bixby in the interval illustrated in FIG. 10A, the electronic apparatus 100 may determine a type corresponding to voice ID, text, emotional (text), and emotional (voice) in the intervals illustrated in FIGS. 10A, 10B, 10C and 10D, respectively.

The electronic apparatus 100 may recognize text information corresponding to "over there" in the interval illustrated in FIG. 10B. In this example, the electronic apparatus 100 may determine a gesture type in the intervals illustrated in FIGS. 10B, 10C and 10D and provide response information corresponding to the user voice command.

Referring to FIGS. 10A-10D, the electronic apparatus 100 may provide response information corresponding to the user voice command by selecting another type according to a time interval. When analyzing all data corresponding to the gesture type regardless of the time interval, processing time may be long. Since the electronic apparatus 100 selectively uses only input data corresponding to a specific time interval, it may shorten the processing time.

FIG. 11 is a diagram illustrating various examples of providing information corresponding to a user voice command using voice or emotion data.

An operation that determines whether to provide response information corresponding to a user voice command using which type according to a received input data.

An example 1 assumes a case in which a user utters "Bixby, turn on the air conditioner over there." A wake-up word may correspond to Bixby. When Bixby uttered by the user is recognized, the electronic apparatus 100 may determine a text type. When the user utters "the air conditioner over there", the electronic apparatus 100 may determine a text type and a gesture type. In addition, when the user utters "turn on", the electronic apparatus may determine a voice ID type.

An example 2 assumes a case in which the user utters "Bixby, buy this book." A wake-up word may correspond to Bixby. When the user utters "this book", the electronic apparatus 100 may determine a text type and a gesture type, and when the user utters "buy", it may determine at least one of voice ID or face ID.

An example 3 assumes a case in which the user utters "Bixby, play ballad music." A wake-up word may correspond to Bixby. When the user utters "ballad music", the electronic apparatus 100 may determine a text type. When the user utters "play", the electronic apparatus 100 may determine voice ID type. When the electronic apparatus 100 determines that the user's emotion is depressed in at least one of voice data or image data, the electronic apparatus may determine emotional (image), emotional (text) and emotional (voice) types.

An example 4 assumes a case in which the user utters "Bixby, register a plan for travel on December 2." A wake-up word may correspond to Bixby. When the user utters "December 2" and "travel", the electronic apparatus 100 may determine text. When the user utters "register a plan," the electronic apparatus 100 may determine at least one of voice ID or face ID. In addition, when the electronic apparatus 100 determines that the user's emotion is in a pleasant mood, the electronic apparatus 100 may determine emotional (image), emotional (text), and emotional (voice).

Examples of an operation that determines an emotional state determined in the examples 3 and 4 will be described. The electronic apparatus 100 may use at least one of image data, voice data or text information analyzed from the voice data in order to determine the user's emotional state. When the electronic apparatus 100 recognizes that the user's emotion shows a particular emotional state such as pleasure, sadness or the like in the image data, the voice data or the text information analyzed from the image data, the electronic apparatus 100 may determine all of motion (image), emotional (text) and emotional (voice).

In FIG. 11, the electronic apparatus 100 determines a particular type may refer, for example, to providing response information corresponding to the user voice command using the particular type.

The disclosure is not limited to the examples above, and the electronic apparatus 100 may select or determine in various ways in accordance with a user's setting.

Referring to FIG. 11, the electronic apparatus 100 may, for example, use only a type corresponding to a preset data and provide response information corresponding to the user voice command.

FIG. 12 is a diagram illustrating an example operation of storing input data temporarily and providing response information corresponding to a user voice command using the temporary input data according to an embodiment of the disclosure.

The electronic apparatus 100 may temporarily store input data stored in a plurality of types for predetermined time. In addition, when an additional command of the user is input, the electronic apparatus 100 may provide response information corresponding to the user voice command using the input data stored temporarily.

For example, when a user does not point a specific direction while uttering "set temperature to 24 degrees" after performing an operation of pointing a specific direction while uttering "Bixby, turn on the air conditioner over there", the electronic apparatus 100 may not obtain information corresponding to the user voice command "set the temperature to 24 degrees." This is because the user voice command "set temperature to 24 degrees" does not have a target to be controlled. Accordingly, when information corresponding to the user voice command is not obtained, the electronic apparatus 100 may provide response information corresponding to the user voice command using a previous analysis stored temporarily.

The aforementioned embodiments may use information corresponding to the gesture type or text type that can recognized the target since the target is not recognized. The text type obtained in the previous time interval includes text information of "Bixby, turn on the air conditioner over there" so that the electronic apparatus may determine that the air conditioner is a target to be controlled.

According to another embodiment, the electronic apparatus 100 may not immediately use the temporarily stored data. When type information of at least one of face ID or voice ID matches, the electronic apparatus 100 may use the temporarily stored data.

Referring to FIG. 12, the electronic apparatus 100 may increase a recognition rate for the user voice command using input data corresponding to the previous time interval, thereby improving convenience from the user's point of view.

FIG. 13 is a diagram illustrating an embodiment that provides response information corresponding to a user voice command by assigning weight to a plurality of input data according to an embodiment of the disclosure.

The electronic apparatus 100 may provide select some types among the plurality of types and provide response information corresponding to the user voice command. Response information corresponding to the user voice command may be obtained by assigning different weights from each other according to the selected type.

Referring to FIG. 11, an operation of analyzing an emotional state is described in an example 3. In order to analyze the emotional state, the electronic apparatus 100 may use emotional (image), emotional (text) and emotional (voice). When a user's emotional state corresponds to sadness in any one of emotional (image), emotional (text) and emotional (voice) types, the electronic apparatus 100 may determine a final emotional state using all of the types which are emotional (image), emotional (text), and emotional (voice). For example, although the sadness state is determined in a specific time interval, it may be separately checked whether the user's final emotional state corresponds to sadness.

In order to check whether the user's final emotional state corresponds to sadness separately, the electronic apparatus 100 may use all of emotional (image), emotional (text), and emotional (voice) types. The electronic apparatus 100 may assign different weights to each type. In addition, the electronic apparatus 100 may determine weights in consideration of the amount of change in data. In detail, the electronic apparatus 100 may assign a larger weight as a type of the amount of change in data is larger.

Referring to FIG. 13, data in emotional (image) and emotional (text) types are constant showing sad or neutral, but emotional (voice) type has been changed from neutral to sad. The electronic apparatus 100 may analyze a final emotional state of the user by applying a large weight to the emotional (voice) type having the largest change in data.

The AI learning model may be able to determine a criterion for determination in assigning weights by learning itself. The AI learning model may analyze a large amount of stored input data and response information corresponding to input data, and calculate a recognition rate by applying various weight values to a type having the largest amount of change in data. In addition, the AI learning model may determine a weight value having the highest recognition rate among various weight values.

The electronic apparatus 100 may determine whether to apply a different weight value applied for each type. For example, if the type having the largest amount of change in data is emotion (voice), a weight of 0.9 may be applied, but if the type having the largest amount of change in data is gesture, a weight 0.5 may be applied. The AI learning model may apply various methods regarding these operations based on the recognition rate, thereby determining whether to apply the same weight for each type or to apply different weights for each type.

When applying different weights for each type, the electronic apparatus 100 may increase the recognition rate for the user voice command. A part where the user's emotion is reflected may be different for each user. The electronic apparatus 100 may determine a part where emotions are well expressed and reflect it in an operation of recognizing by setting different weights according to data changes.

Figure 14:
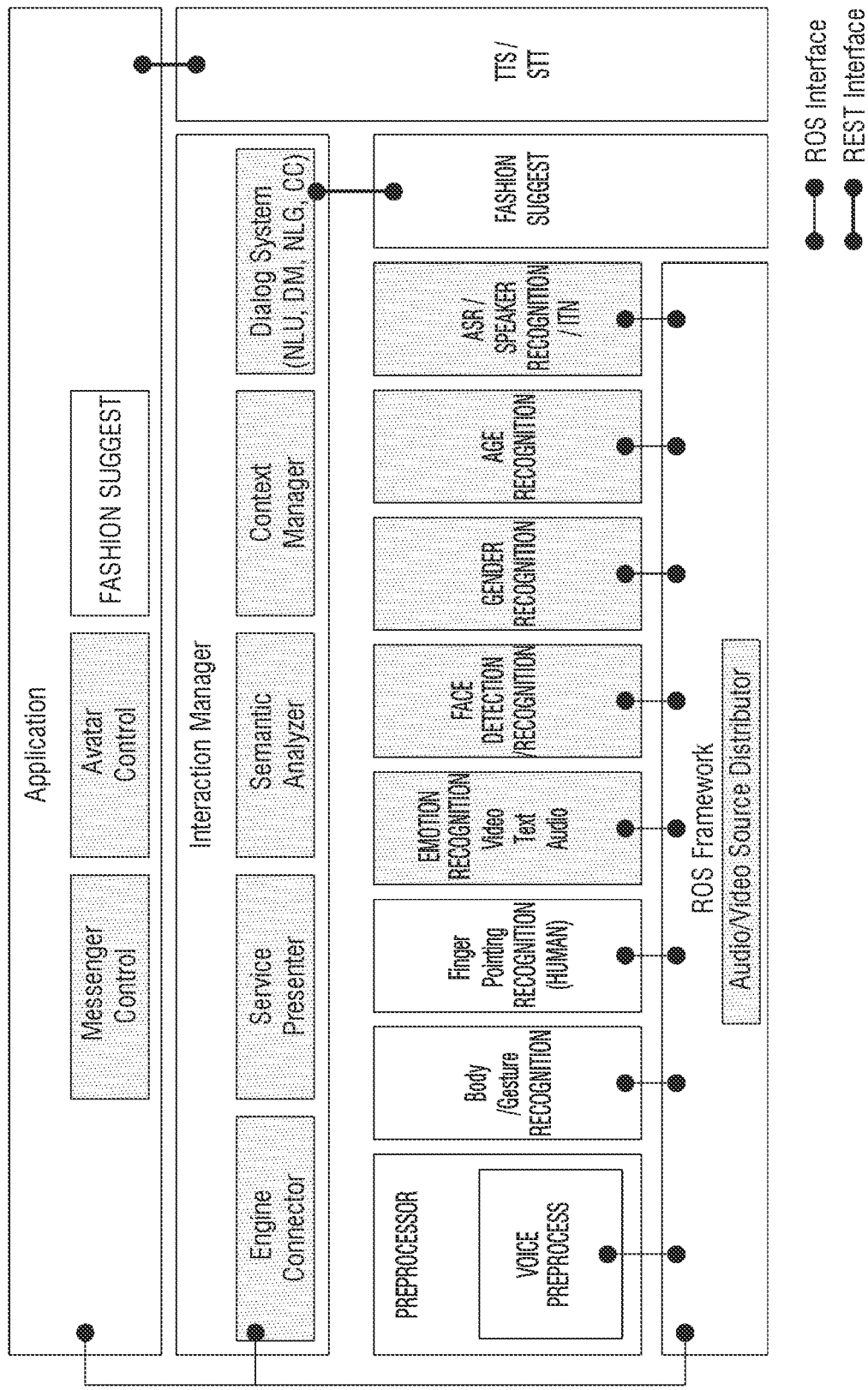
FIG. 14 is a diagram illustrating an example operation of an electronic apparatus for each function according to an embodiment of the disclosure.

FIG. 14 is a diagram illustrating an example operation of an electronic apparatus for each function according to an embodiment of the disclosure.

The electronic apparatus 100 may provide response information corresponding to a user voice command using, for example, a robot operating system (ROS) framework, an interaction manager, and an application.

The electronic apparatus 100 may receive voice or image data from the robot operation system (ROS) framework. In addition, the electronic apparatus 100 may recognize user's information using the received data. For example, the electronic apparatus 100 may include various engines for speaker recognition using body gesture, finger pointing, emotion (image, text and voice), face, gender and age of user, and automatic speech recognition (ASR). The electronic apparatus 100 may selectively use data which is necessary for determining the various user information described above.

Interaction manager may include modules of engine connector, service presenter, semantic analyzer, context manager, and dialog system.

The engine connector module may include various processing circuitry and/or executable program elements and perform engine connection capable of obtaining various user information. In addition, the engine connector module may transmit a specific command to obtain user information obtained from the specific engine. The engine connector module may transmit the obtained user information to the sematic analyzer.

The service presenter module may include various processing circuitry and/or executable program elements and communicate with an application. In detail, the service presenter module may receive a final analysis result from the semantic analyzer and transmit it to the application.

The semantic analyzer module may include various processing circuitry and/or executable program elements and receive data corresponding to user information from various engines, and analyze the data corresponding to the received user information to perform a final analysis operation. The semantic analyzer module may control the specific command to be transmitted to the engine using the engine connector module in order to perform the final analysis operation, and then transmit a result received from the dialog system module to the service presenter.

The context manager module may include various processing circuitry and/or executable program elements and store and manage data occurred from the interaction manager. The context manager module may exchange information between different interaction managers. In addition, the context manager may store and manage user information.

The dialog system module may include various processing circuitry and/or executable program elements and communicate with an external server including a conversation function. The dialog module may transmit an output of internal operations to the external server. In addition, the dialog system module may receive the output from the external server and transmit it to the semantic analyzer. The dialog system module may transmit information on a request for executing a specific task and a result thereof to the context manager module. In addition, the dialog system module may perform operations related to a natural language understanding (NLU), a dialog management (DM), and a natural language generation (NLG) functions, each of which may include various processing circuitry and/or executable program elements.

The application may include at least one of a messenger control module, an avatar control module, and a fashion recommendation module.

A robot operating system (ROS) framework, the interaction Manager, and the application may be connected through a robot operating system (ROS) interface and a representational state transfer (RST) interface.

The ROS framework may be connected to the interaction manager and the application through the ROS interface, and may be connected to the various engines described above through the ROS interface. A fashion recommendation module (module which is not included in the application) may be connected to the interaction manager through the REST interface. In addition, a text-to-speech (TTS) or speech to text (STT) module may be connected to the application through the REST interface.

Figure 15:
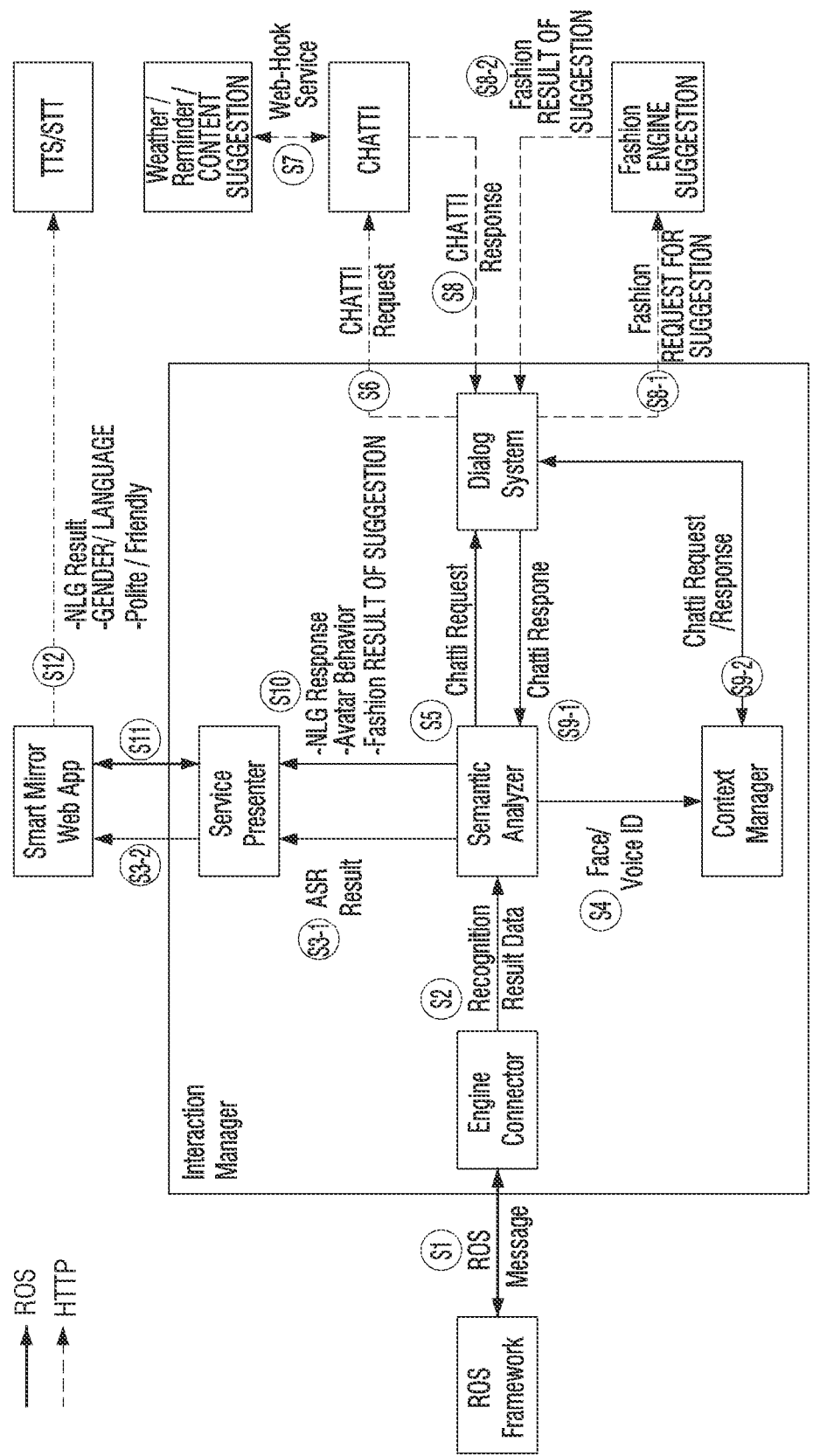
FIG. 15 is a diagram illustrating an example operation of an electronic apparatus by time according to an embodiment of the disclosure.

FIG. 15 is a diagram illustrating an example operation of the electronic apparatus according to an embodiment of the disclosure.

Referring to FIG. 15, an ROS framework may transmit and receive an ROS message with the engine connector (S1). The engine connector module may transmit a recognition analysis data to the service presenter module (S2). The semantic analyzer module may transmit an automatic speech recognition result to the service presenter module (S3-1) and the service presenter module may transmit the automatic speech recognition result to the smart mirror web application (S3-2). The semantic analyzer module may face ID or voice ID information to the context manager module using the received recognition analysis data (S4). In addition, the context manager module may transmit and receive a request and response to an external server that can analyze dialog with the dialog system module (S9-2).

In addition, the semantic analyzer module may transmit a dialog analysis request command for the external server capable of analyzing a conversation to the dialog system module (S5). The dialog system module may transmit the dialog analysis request command for the external server to the external server (S6). In addition, the external server may execute weather, reminder and content recommendation operations using a web-hook Service (S7), and the external server may transmit the execution result to the dialog system module (S8).

The dialog system module may transmit a request command of the fashion recommendation to a fashion recommendation engine (S8-1). The fashion recommendation engine may execute the fashion recommendation operation according to a received request command and transmit a result back to the dialog system module (S8-2).

The dialog system module may transmit information on the execution result according to a received external server or the result of the fashion recommendation to the semantic analyzer module (S9-1). The context manager module may transmit the information on the execution result and the fashion recommendation result according to the external server performed by another interaction manager to the dialog system module (S9-2), and the dialog system module may transmit the received information to the semantic analyzer module.

The semantic analyzer module may transmit the received execution result according to the external server, the fashion recommendation result, NLG response results, averter behavior information, and the like to the service presenter module (S10). In addition, the service presenter module may transmit the corresponding information to the smart mirror web application (S11). The smart mirror web application may transmit the LNG result, gender, language, emotion and the like to a module that performs a text-to-speech (TTS) or speech-to-text (STT) functions (S12).

The interaction manager may use a hypertext transfer protocol (HTTP) to communicate with the external server or the fashion recommendation engine. In addition, the interaction manager may use the ROS method to communicate with a ROS framework and the smart mirror web application.

Referring to FIG. 15, only some example embodiments have been described, and it is not limited to the corresponding modules or configurations.

Figure 16:
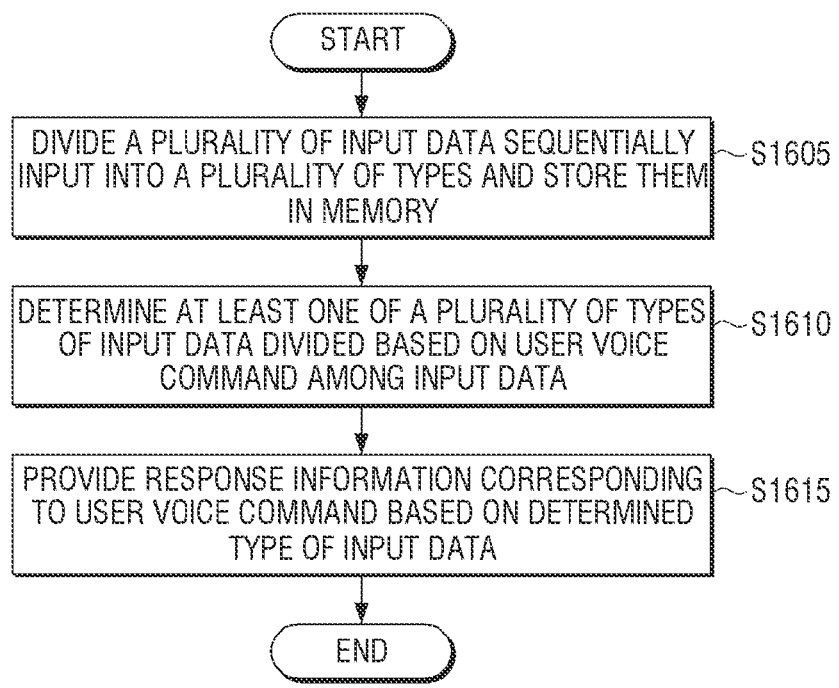
FIG. 16 is a flowchart illustrating an example operation of an electronic apparatus according to an embodiment of the disclosure.

FIG. 16 is a flowchart illustrating an example operation of the electronic apparatus according to an embodiment of the disclosure.

A method of controlling the electronic apparatus according to an embodiment of the disclosure may include dividing a plurality of input data sequentially input into a plurality of types and storing the plurality of input data in the memory 110 (S1605), determining at least one of the plurality of types classified (e.g., divided) based on information related to the user voice command if a user voice command is recognized among the input data (S1610), and providing response information corresponding to the user voice command based on the input data of the determined type (S1615).

Determining at least one of the plurality of classified types (S1610) may determine at least one of the plurality of classified types based on time information related to the user voice command.

In addition, storing in the memory 110 (S1605) may group the input data classified into the plurality of types in a predetermined time unit, and obtain representative data of the plurality of types corresponding to each time unit to store it in the memory 110. Providing response information corresponding to the user voice command may provide response information corresponding to the user voice command based on the determined representative data.

Providing the response information corresponding to the user voice command (S1615) may compare the amount of change in the representative data by the plurality of types corresponding to each time unit, and assign the largest weight to a type having the largest amount of change to provide the response information corresponding to the user voice command.

The plurality of types may include at least one of gesture information, emotion information, face recognition information, gender information, age information or voice information.

In addition, determining at least one of the input data of the plurality of classified types (S1610) may recognize the user voice command based on at least one of the gesture information or the voice information.

In addition, when the user voice command is recognized in the input data, determining at least one of the input data of the plurality of classified types (S1610) may recognize the user voice command as a preset voice recognition unit, and determine at least one among the input data of the plurality of classified types based on a time interval belonging to at least one voice recognition unit.

When a wake-up word is included in the user voice command, determining at least one of the input data of the plurality of classified types (S1610) may recognize the user voice command as the preset voice recognition unit based on the time interval where the wake-up word is recognized.

When the response information cannot be provided based on the input data input during the preset time interval after the wake-up word is recognized, providing the response information corresponding to the user voice command (S1615) may use the input data input in the time interval before recognizing the wake-up word and provide the response information corresponding to the user voice command.

In addition, determining at least one of the input data of the plurality of classified types (S1610) may determine at least one of the input data of the plurality of classified types based on at least one of information on the user intent or a control object recognized by the user voice command.

The methods according to the above-described embodiments may be realized as an application that may be installed in the existing electronic apparatus.

Further, the methods according to the above-described embodiments may be realized by upgrading the software or hardware, or a combination of the software and hardware of the existing electronic apparatus.

The above-described example embodiments may be executed through an embedded server in the electronic apparatus or through an external server outside the electronic apparatus.

The method of controlling an electronic apparatus according to the above-described various embodiments may be realized as a program and provided in the user terminal device. For example, the program including a method for controlling a display apparatus according to example embodiments may be stored in a non-transitory computer readable medium and provided therein.

Various example embodiments described above may be embodied in a recording medium that may be read by a computer or a similar apparatus to the computer using software, hardware, or a combination thereof. According to an example hardware embodiment, example embodiments that are described in the present disclosure may be embodied using at least one selected from application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for performing other functions. In some cases, the embodiments described in the present disclosure may be realized as the processor 120 itself. In an example software configuration, various embodiments described in the disclosure such as a procedure and a function may be embodied as separate software modules. The software modules may respectively perform one or more functions and operations described in the present disclosure.

Methods of controlling a display apparatus according to various example embodiments may be stored on a non-transitory readable medium. Computer instructions stored in the non-transitory readable medium allow the specific apparatus to perform processing operations in the electronic apparatus according to the above-described various embodiments when executed by the processor of the specific apparatus.

The non-transitory computer readable recording medium may refer, for example, to a medium that stores data and that can be read by devices. For example, the non-transitory computer-readable medium may be CD, DVD, a hard disc, Blu-ray disc, USB, a memory card, ROM, or the like.

The foregoing example embodiments and advantages are merely examples and are not to be understood as limiting the present disclosure. The present teachings may be readily applied to other types of apparatuses. The description of the example embodiments of the present disclosure is intended to be illustrative, and not to limit the scope of the claims, and many alternatives, modifications, and variations will be apparent to those skilled in the art.

What is claimed is:

1. An electronic apparatus comprising:
a memory; and
a processor configured to control the electronic apparatus to:
receive a plurality of input data comprising: image data captured via a camera of the electronic apparatus and/or an external device, and voice data captured via a microphone of the electronic apparatus and/or an external device;
group the input data classified into a plurality of types based on a neural network;
obtain representative data for each of the plurality of types based on the grouped input data to store in the memory;
determine at least one type among the classified plurality of types based on a voice command being recognized among the input data; and
provide response information corresponding to the voice command based on representative data corresponding to the determined at least one type.

2. The electronic apparatus as claimed in claim 1, wherein the processor is configured to control the electronic apparatus to determine at least one type among the classified plurality of types based on time information related to the voice command.

3. The electronic apparatus as claimed in claim 1, wherein only some of the classified plurality of types are included in the determined type.

4. The electronic apparatus as claimed in claim 1, wherein the processor is configured to control the electronic apparatus to:
compare an amount of change in representative data for each of the plurality of types corresponding to each time unit, and assign a largest weight on a type having a largest amount of change to provide response information corresponding to the voice command.

5. The electronic apparatus as claimed in claim 1, wherein the plurality of types comprise at least one of gesture information, emotion information, face recognition information, gender information, age information or voice information.

6. The electronic apparatus as claimed in claim 1, wherein the processor is configured to control the electronic apparatus to recognize the voice command based on at least one of gesture information or voice information among the input data.

7. The electronic apparatus as claimed in claim 1, wherein the processor is configured to control the electronic apparatus to:

recognize the voice command as a preset voice recognition unit based on the voice command being recognized in the input data, and determine at least one type among the classified plurality of types based on a time interval of at least one voice recognition unit.

8. The electronic apparatus as claimed in claim 7, wherein the processor is configured to control the electronic apparatus to: recognize the voice command as the preset voice recognition unit based on the time interval where a wake-up word is recognized based on the wake-up word being included in the voice command.

9. The electronic apparatus as claimed in claim 8, wherein the processor is configured to control the electronic apparatus to: provide response information corresponding to the voice command using input data input in a previous time interval before the wake-up word is recognized based on the response information not being provided based on the input data input for a preset time interval after the wake-up word is recognized.

10. The electronic apparatus as claimed in claim 7, wherein the processor is configured to control the electronic apparatus to: determine at least one type among the classified plurality of types based on information on an intention of a user or an object to be controlled which are recognized in the voice command.

11. A computer implemented method of controlling an electronic apparatus comprising:
receiving a plurality of input data comprising image data captured via a camera of the electronic apparatus and/or an external device and voice data captured via a microphone of the electronic apparatus and/or an external device;
grouping the input data classified into a plurality of types based on a neural network;
obtaining representative data for each of the plurality of types based on the grouped input data to store in a memory of the electronic apparatus;
determining at least one type among the classified plurality of types based on a voice command being recognized among the input data; and
providing response information corresponding to the voice command based on representative data corresponding to the determined at least one type.

12. The method as claimed in claim 11, wherein the determining at least one among input data of the classified plurality of types comprises determining at least one type among the classified plurality of types based on time information related to the voice command.

13. The method as claimed in claim 11, wherein only some of the classified plurality of types are included in the determined type.

14. The method as claimed in claim 11, wherein the providing the response information corresponding to the voice command comprises comparing an amount of change in the representative value for each of the plurality of types corresponding to each time unit, and assigning a largest weight on a type having a largest amount of change to provide response information corresponding to the voice command.

15. The method as claimed in claim 11, wherein the plurality of types comprises at least one of gesture information, emotion information, face recognition information, gender information, age information or voice information.

16. The method as claimed in claim 11, wherein the determining at least one type among the classified plurality of types comprises recognizing the voice command based on at least one of gesture information or voice information among the input data.

17. The method as claimed in claim 11, wherein the determining at least one type among the classified plurality of types comprises, based on a voice command being recognized in the input data, recognizing the voice command as a preset voice recognition unit, and determining at least one type among the classified plurality of types based on a time interval belonging to at least one voice recognition unit.

18. The method as claimed in claim 17, wherein the determining at least one type among the classified plurality of types comprises, based on a wake-up word being included in the voice command, recognizing the voice command as the preset voice recognition unit based on the time interval where the wake-up word is recognized.

19. The method as claimed in claim 18, wherein the providing the response information corresponding to the voice command comprises, based on the response information not being provided based on the input data input for a preset time interval after the wake-up word is recognized, providing the response information corresponding to the voice command using the input data input in a previous time interval before the wake-up word is recognized.

20. The method as claimed in claim 17, wherein the determining at least one type among the classified plurality of types comprises determining at least one type among the classified plurality of types based on at least one of an intention of a user or an object to be controlled which are recognized in the voice command.

* * * * *